(12) United States Patent
Giacomini

(10) Patent No.: US 11,624,418 B2
(45) Date of Patent: Apr. 11, 2023

(54) MECHANICAL STRUCTURE FOR SHOCK ABSORPTION AND VIBRATION REDUCTION

(71) Applicant: Jean Phillipe Giacomini, Harrodsburg, KY (US)

(72) Inventor: Jean Phillipe Giacomini, Harrodsburg, KY (US)

( * ) Notice: Subject to any disclaimer, the term of this patent is extended or adjusted under 35 U.S.C. 154(b) by 1069 days.

(21) Appl. No.: 16/307,838

(22) PCT Filed: Jun. 6, 2017

(86) PCT No.: PCT/US2017/036155
§ 371 (c)(1),
(2) Date: Dec. 6, 2018

(87) PCT Pub. No.: WO2017/214147
PCT Pub. Date: Dec. 14, 2017

(65) Prior Publication Data
US 2019/0293142 A1 Sep. 26, 2019

Related U.S. Application Data

(60) Provisional application No. 62/346,098, filed on Jun. 6, 2016.

(51) Int. Cl.
*F16F 3/087* (2006.01)
*E04H 17/14* (2006.01)
*F16F 1/373* (2006.01)

(52) U.S. Cl.
CPC ....... *F16F 3/0876* (2013.01); *E04H 17/1413* (2013.01); *F16F 1/373* (2013.01); *F16F 2224/0225* (2013.01)

(58) Field of Classification Search
CPC ............ F16F 3/0876; F16F 1/373; F16F 2224/0225; E04H 17/1413; A47C 27/065; A63K 3/046
See application file for complete search history.

(56) References Cited

U.S. PATENT DOCUMENTS

| 3,251,076 A | 5/1966 | Burke |
| 3,633,228 A * | 1/1972 | Zysman ................ A47C 7/20 267/143 |

(Continued)

FOREIGN PATENT DOCUMENTS

| CA | 2669890 A1 * | 12/2010 | ......... A41D 13/0155 |
| CA | 2889450 A1 * | 10/2015 | ............. A47C 27/05 |

(Continued)

*Primary Examiner* — Melanie Torres Williams
(74) *Attorney, Agent, or Firm* — BakerHostetler

(57) ABSTRACT

The disclosure is directed to a single layer including a plurality of unit cells. Each unit cell includes a first bowling pin structure interlocked with a second bowling pin structure arranged in an opposite orientation to the first bowling pin structure. The first bowling pin structure has a first sidewall, a first wide end, and an opposing first narrow or equal size end. Likewise, the second bowling pin structure has a second sidewall, a second wide end. Each of the bowling pin structures has a center axis along a longitudinal axis of the single layer structure. The first and second sidewalls are configured to have a 3D "S" shape along the longitudinal or vertical axis such that each of the first wide end and the second wide end has a convex shape and each of the first narrow or equal size end and the second narrow or equal size end has a concave shape.

44 Claims, 18 Drawing Sheets

(56) References Cited

U.S. PATENT DOCUMENTS

| | | | |
|---|---|---|---|
| 4,186,223 A | 1/1980 | Hancock | |
| 5,238,231 A | 8/1993 | Huang | |
| 5,551,673 A | 9/1996 | Furusawa et al. | |
| 5,927,696 A | 7/1999 | Hagemeister | |
| 6,284,346 B1 * | 9/2001 | Sheridan | B32B 3/28 |
| | | | 428/167 |
| 7,624,462 B2 * | 12/2009 | Cao | A47C 27/144 |
| | | | 267/153 |

FOREIGN PATENT DOCUMENTS

| | | | | |
|---|---|---|---|---|
| DE | 202005016477 U1 * | 2/2006 | | A63K 3/046 |
| EP | 1570888 A2 * | 9/2005 | | A63K 3/046 |
| GB | 838983 A * | 6/1960 | | |
| GB | 1113772 A * | 5/1968 | | |

\* cited by examiner

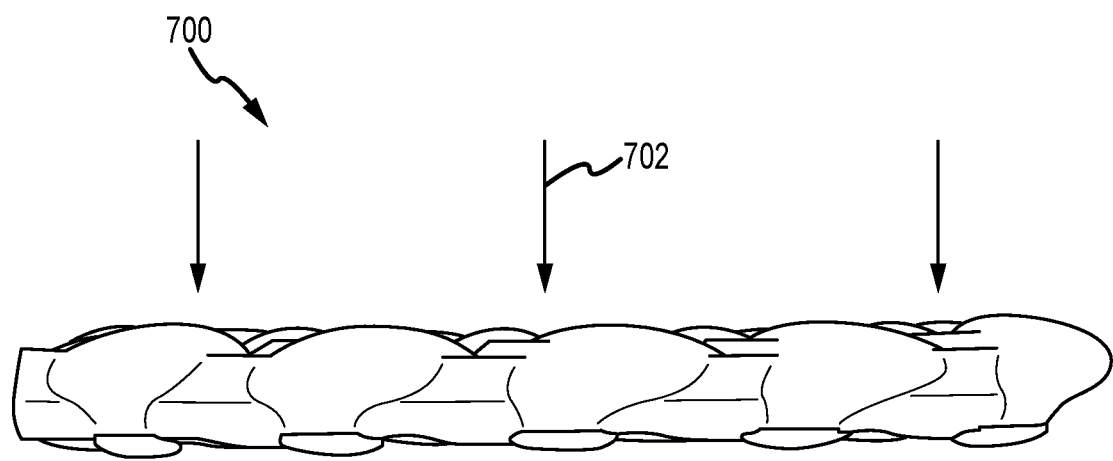
FIG. 7
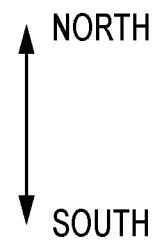

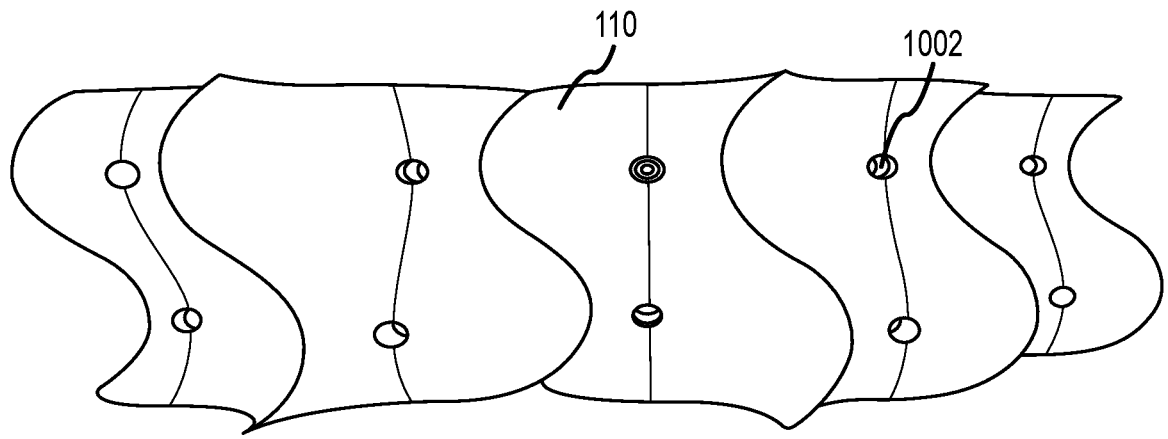
FIG.10
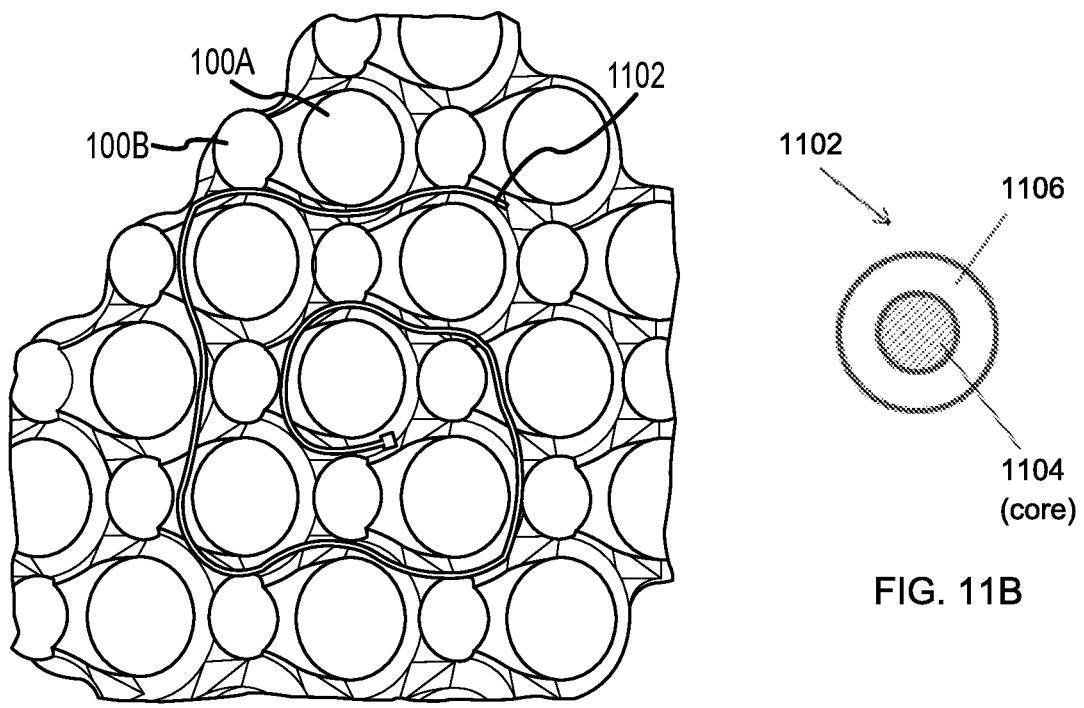
FIG.11A
FIG. 11B

MECHANICAL STRUCTURE FOR SHOCK ABSORPTION AND VIBRATION REDUCTION

CROSS-REFERENCE TO RELATED PATENT APPLICATION

This patent application claims the benefit of U.S. Patent Application No. 62/346,098, entitled "Mechanical Structure for Shock Absorption and Vibration Reduction" filed on Jun. 6, 2016 under 35 U.S.C. § 119(e), which is incorporated herein by reference in its entirety.

FIELD

The disclosure is directed to a mechanical structure that can absorb shock and vibration, as well as provide heat dissipation.

BACKGROUND

A conventional honeycomb structure can provide a high strength-to-weight ratio. However, the conventional honeycomb structure does not provide shape memory. Also, it is desirable to improve the shock and vibration characteristics of the conventional honeycomb structure.

BRIEF SUMMARY

The disclosure provides a mechanical structure with improved performance over the conventional honeycomb structure.

In one aspect, the disclosure is directed to a layer structure. The structure can be a single layer including a plurality of unit cells. Each unit cell includes a first bowling pin structure interlocked with a second bowling pin structure arranged in an opposite orientation to the first bowling pin structure. The first bowling pin structure has a first sidewall, a first wide end, and an opposing first narrow or equal size end. Likewise, the second bowling pin structure has a second sidewall, a second wide end. Each of the bowling pin structures has a center axis along a longitudinal axis of the single layer structure. The first and second sidewalls are configured to have a 3D "S" shape along the longitudinal or vertical axis such that each of the first wide end and the second wide end has a convex shape and each of the first narrow or equal size end and the second narrow or equal size end has a concave shape.

In another aspect, the first wide end of the first bowling pin structure is connected to the second narrow or equal end of the second bowling pin structure by a connecting sheet. Likewise, the first narrow or equal size end of the first bowling pin structure is connected to the second wide end of the second bowling pin structure by the connecting sheet.

In another aspect, the single layer structure includes an elongated member integrated with the single layer structure for vibration control.

In another aspect, each of the first and second bowling pin structure has one or more holes in the sidewall. The holes being aligned along a transverse axis to the longitudinal axis.

In another aspect, the structure includes a vertical space extending along the longitudinal axis between the first bowling pin structure and the second bowling pin structure.

In another aspect, each of the first and second bowling pin structures have a wide dome at the corresponding wide end and a narrow or equal size dome at the corresponding narrow or equal size end.

In another aspect, the single layer structure is a laminated structure when viewed from a top surface or a bottom surface, the single layer structure comprising a row of wide ends of the bowling pin structures interleaved with a row of narrow or equal ends of the bowling pin structures. In another aspect, the structure may include multiple layers.

In one aspect, a fence with horse/rider protection features is provided. The fence may include a rail having a first end and a second end supported by first and second support shelf members. The first and second support shelf members are attached to respective first and second end support members. The fence may also include first and second shape memory members between the rail and the respective end support members, the shape memory members being positioned on the upper surfaces of the support shelf members.

In another aspect, the fence may include a fabric covering at least a portion of the rail between the first and second support shelf members.

In another aspect, the upper surface of each of the first and second support shelf members may include a downward slope toward the joint between the support shelf member and the end support member.

In another aspect, the shape memory member may include the single layer structure.

In another aspect, the shape memory member may include the multilayer structure.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein:

FIG. 7 is a side perspective view of the single layer of FIG. 4 after applying a uniform compression perpendicular to the layer in an embodiment of the disclosure.

FIG. 10 is a perspective view of a single layer including a number of the bowling pin structures with holes (e.g., pin holes) on sidewalls of the bowling pin structures in an embodiment of the disclosure.

FIG. 11A is a top view of a single layer including a number of the bowling pin structures with a spiral wire in an embodiment of the disclosure.

FIG. 11B is a sectional view of the wire of FIG. 11A in an embodiment of the disclosure.

DETAILED DESCRIPTION

Figure 1A:
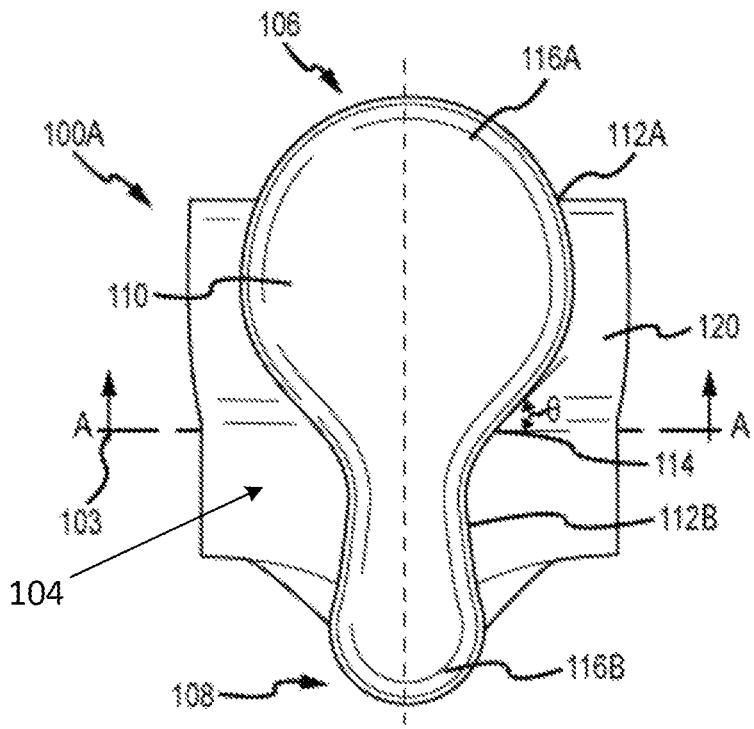
FIG. 1A is a perspective view of a first bowling pin structure in an embodiment of the disclosure.

The disclosure may be understood by reference to the following detailed description, taken in conjunction with the drawings as described below. It is noted that, for purposes of illustrative clarity, certain elements in various drawings may not be drawn to scale.

Overview

The disclosure provides a layer structure including a number of pairs of bowling pin structures or individual cells. The disclosure also provides a multilayer structure including the layer structures fabricated individually and stacked together. The disclosure further provides a multilayer structure including the layer structure as an inner layer and outer layers formed of closed-cell foams.

The structure including the layer structure and the multilayer structures may provide protection for components, small or large, from shock and vibration. The structure can absorb shock and diminish pressure. The structure can provide a harmonious integration of several different concepts, including (a) spiral wires for vibration conduction and reduction; (b) a honeycomb structure having high strength-to-weight ratio but with different shapes; (c) a "vault lock" over a larger surface by interlocking the bowling pin structures; (d) a "dynamic Keystone arch" to initiate a shape memory after the vault locks itself; and (e) a principle of "communicating vases" for dissipating shock and diminishing pressure.

Specifically, the spiral wires may be integrated with the structure on outer surfaces. The spirals wires may also transmit or conduct vibration, and/or heat.

The high ratio of strength-to-weight is achieved due to hollow portions inside the bowling pin structures that form the structure, which is similar in principle to a honeycomb structure, but has curved walls rather than straight ones. There are also some empty walled spaces between the bowling pin structures, which provide the structure with increased structural strength and lesser compressibility.

The dynamic keystone arch is activated when the structure is progressively compressed to its maximum. The more compressed the structure becomes on one of its sides, the more resistant it becomes to further compression, because the internal volume of the bowling pins is progressively reduced. Also, the domes on the concave surface are progressively reduced. At the same time, the domes on the convex side are expanded to become eventually nearly flat.

Under compression by external forces, the layer is progressively deformed to its maximum concavity by pressure or shock. The resistance to this compression of the interlocking multiple bowling pin structures occurs simultaneously by the compression of the concave surface and the extension of the convex opposite surface.

This phenomenon increases the strength of the structure like a double curved bow and creates an eventual point of no return. It is referred to as the vault lock and it initiates the memory of the structure (return to its original shape).

If the material used for the manufacturing of the structure and its dimensions are adequate to the degree of shock or pressure applied to it, the arch will initiate shape memory when the shock/pressure has been sufficiently absorbed by the original deformation of the structure. The structure's shape memory can make it return to its original shape The shape memory of the structure helps improve its long term integrity and its resistance to fatigue or creep.

The structure absorbs shock and diminishes vibrations or dissipates heat and force over the greater surface created by the multiples domes on one or both of the structure's faces.

The principle of communicating vases is applied by including holes (e.g., pin holes) on sidewalls of the bowling pin structures and the empty spaces between the bowling pin structures. When the structure is pressured, these holes can allow for movement of fluid fillers (including any kind of gases) between all the bowling pin structures.

The structure may be made with three components including (a) a rigid structure formed of a number of pairs of bowling pin structures or individual cells arranged in a layer, where the cells can be made of metal, alloy, plastic, fiberglass, carbon fibers, cardboard, rubber, high durometer gels, any rigid or semi-rigid material, among others, depending on each application; (b) a spiral wire or wires integrated with the structure formed of the bowling pin structures, where the wires may have a core formed of any material with a higher density than the bowling pin structures, for high vibration conduction (e.g. plastic, steel, titanium, or nylon, among others) and a coating over the core to diminish vibration; (c) different fillers used inside the bowling pin structures or individual cells, such as polymers, foams, gels, or fluid including gas, air, oil or water.

The structure offers a controlled, measurable, variable, harmonized combination of mechanical effects beneficial to many engineering situations requiring small components such as used in electronics, and/or large components such as used in building construction, bridges, or all types of vehicles (cars, trucks, planes, ships).

Bowling Pin Structures

Figure 1B:
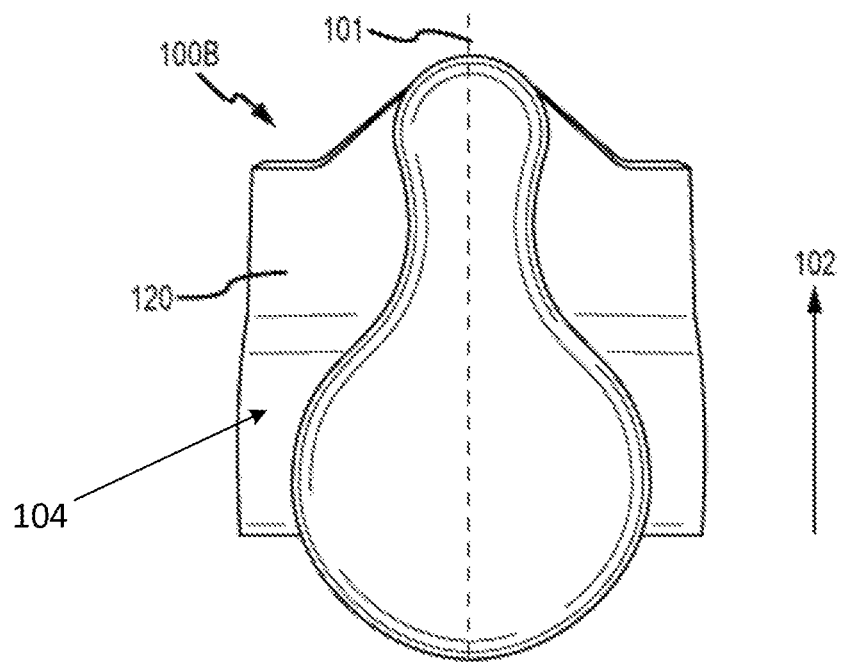
FIG. 1B is a perspective view of a second bowling pin structure in an embodiment of the disclosure.

Unlike a conventional honeycomb structure that uses vertical straight walls in a polygonal section, the layer structure can have a single layer using different shapes for the bowling pin structures or individual cells. Each bowling pin structure has a three dimensional (3D) "S" shape following two curves, one concave and one convex as described herein. As shown in FIGS. 1A and 1B, each of first and second bowling pin structures 100A and 100B has a central axis 101 along a longitudinal axis 102, and also an example circular cross-section 104 that varies the diameter in a center plane 103 along the longitudinal axis between a first wide end 106 and second opposite narrow end 108. The longitudinal axis is perpendicular to the single layer structure. The longitudinal axis may also be referred to a vertical axis. The center plane 103 is shown by arrows A-A to cross-section the bowling pin structure. The second bowling pin structure 100B is in a reverse orientation from the first bowling pin structure 100A.

Each of bowling pin structures 100A and 100B has a continuous sidewall 110. Each bowling pin can have a hollow center inside the sidewall 100. The sidewall has a three dimensional (3D) "S" shape following two curves, concave and convex, including a vertical 3D convex shape 112A at the first wide end, as viewed from outside the sidewall, followed by a 3D concave shape 112B at the second narrow end 108 along the longitudinal or vertical axis 102, as viewed outside the sidewall.

Alternatively, if the sidewall is viewed inside the bowling pin structure, the concave surface or the convex surface is reversed when viewed outside the bowling pin structure. For example, the sidewall 110 of the bowling pin structure 100A has the convex shape as seen from the inside of the bowling pin structure toward the narrow end 108, and the 3D concave shape as seen from the inside toward the wide end 106.

In alternative embodiments, the narrow end 108 may have an equal size to the wide end 106 (not shown).

Cross-section of the bowling pin structure can have any closed shape. For example, the cross section can be circular, elliptical, or polygonal, among any other shapes. In various aspects, the cross-section does not alter the fact that the surface of the bowling pin structure has a 3D "S" shape in the longitudinal direction.

Each of the bowling pin structures 100A and 100B may include a sheet 120 attached to the sidewall 110 of the bowling pin structure. The sheet 120 is used to connect two neighboring bowling pin structures 100A and 100B.

The bowling pin structure can have a height along the longitudinal axis 102. When the bowling pin structure is elongated along the longitudinal axis, the single layer structure formed of the elongated bowling pin structures has increased structural strength (e.g. shear strength, compression strength, tensile strength). When the bowling pin structure becomes more curved, the single layer structure is compressed along the longitudinal axis 102 and can absorb more shock.

The sidewall 110 can include a central transition portion 114 between the 3D concave shape near the narrow end and the 3D convex shape near the wide end, as viewed outside the bowling pin structure. The central transition portion 114 is defined by the second derivative of the shape which is zero. Therefore, the central transition portion 114 may have an angle θ, as shown in FIG. 1A. The angle of the central axis 101 of each bowling pin structure 100A relative to the surface of the single layer structure may vary. The larger the angle θ with respect to the central plane 103 of the bowling pin structure, the stronger the single layer structure becomes. The smaller the angle θ of the bowling pin structure with respect to the center plane, the more shock absorption the single layer structure has.

The bowling pin structure 100A may include a dome 116A which seals the wide end 106 of the bowling pin structure and another dome 116B which seals the narrow end 108 of the bowling pin structure. The domes have a round shape and thus provide better shock absorption than a flat surface that seals the wide end or narrow end.

It will be appreciated by those skilled in the art that the cross-section of the bowling pin structure or individual cell may vary in shape, including polygonal, among others.

It will be appreciated by those skilled in the art that the sidewall may vary in thickness. The sidewall thickness may be uniform or non-uniform.

The bowling pin structures may be made of a flexible or a compressible material, for example, plastics, rubbers, metals, alloy, composite, fiberglass, carbon fibers, cardboard, high durometer gels, or any rigid or semi-rigid material, among others.

Unit Cell Formed of a Pair of Bowling Pin Structures

Figure 2:
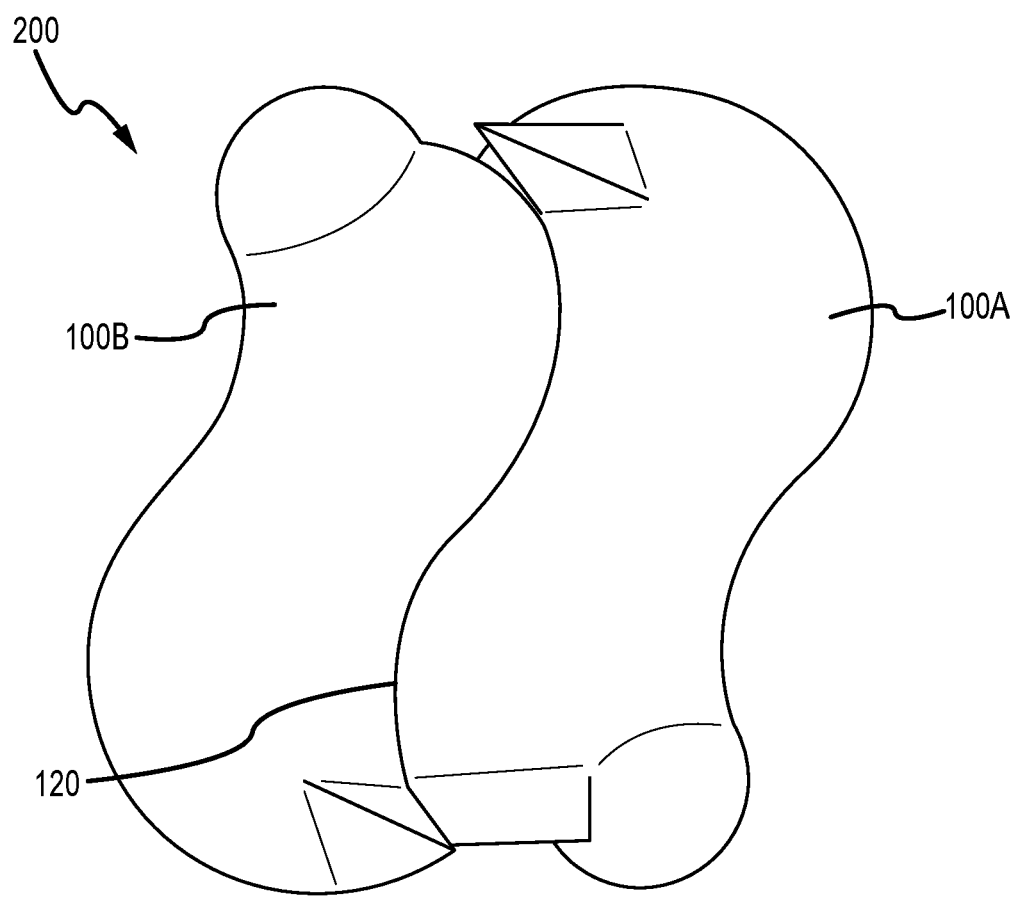
FIG. 2 is a perspective view of a unit cell including two bowling pin structures in an embodiment of the disclosure.

Each unit cell 200 includes two bowling pin structures that are interlocked. As shown in FIG. 2, each unit cell 200 includes two bowling pin structures that are arranged with a first bowling pin structure 100A in an upside position and a second bowling pin structure 100B in a downside position. The two bowling pin structures 100A and 100B are placed next to each other.

The unit cell 200 can be the basic unit cell for constructing the single layer structure. As shown in FIG. 2, the connection 120 between the two bowling pin structures has a two dimensional (2D) "S" shape when viewed from the side.

In various aspects, the bowling pin structures can be in alternating structures orientations—the first bowling pin structure is "narrow end up," while the second bowling pin structure is "narrow end down." In some instances, a single "narrow end up" bowling pin can be part of two unit cells.

In some embodiments, half the bowling pin structures are placed "neck up" and the other half are upside down in a regularly alternating pattern. The 3D "S" shape of the bowling pin structure guides the compression of the individual cells, and thus reduces the fatigue or creep of the structure.

Single Layer Structure and Multilayer Structure

Each series of bowling pin structures can be laid on end on a plane, with half the bowling pin structures having the narrow or equal size end up and the other half the bowling pin structures in a narrow or equal size end down longitudinal direction. The bowling pin structures can be interspersed in a regular layout, such that the narrow or equal size end bowling pin structures can be surrounded symmetrically by four wide-end bowling pin structures and vice versa.

Figure 3A:
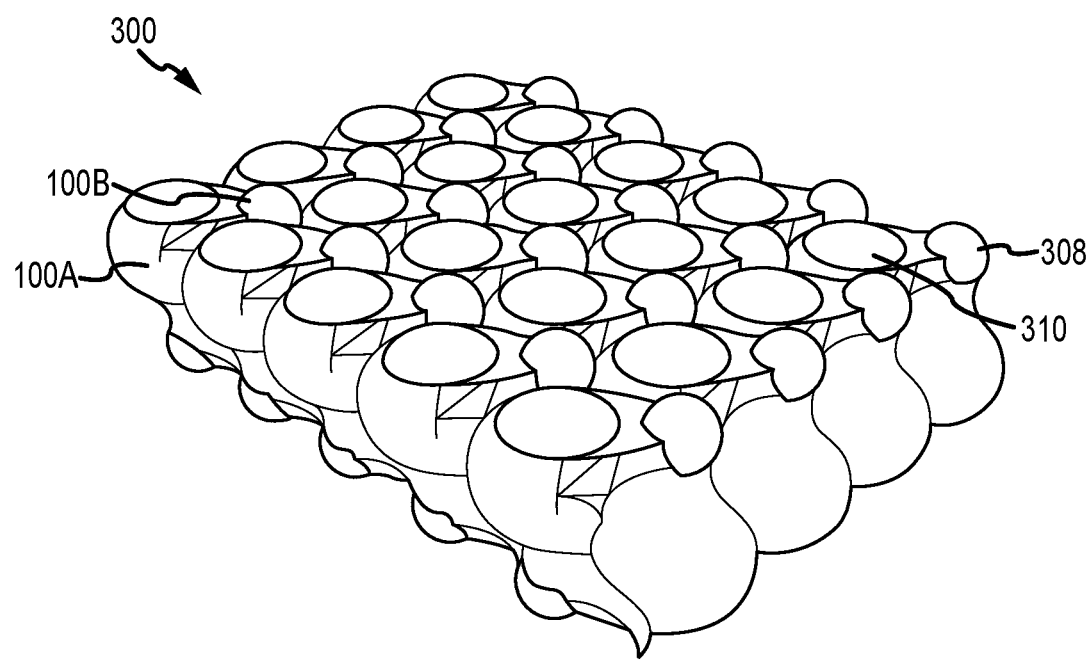
FIG. 3A is a perspective view of a single layer including a number of the bowling pin structures of FIG. 1 in an embodiment of the disclosure.
Figure 3B:
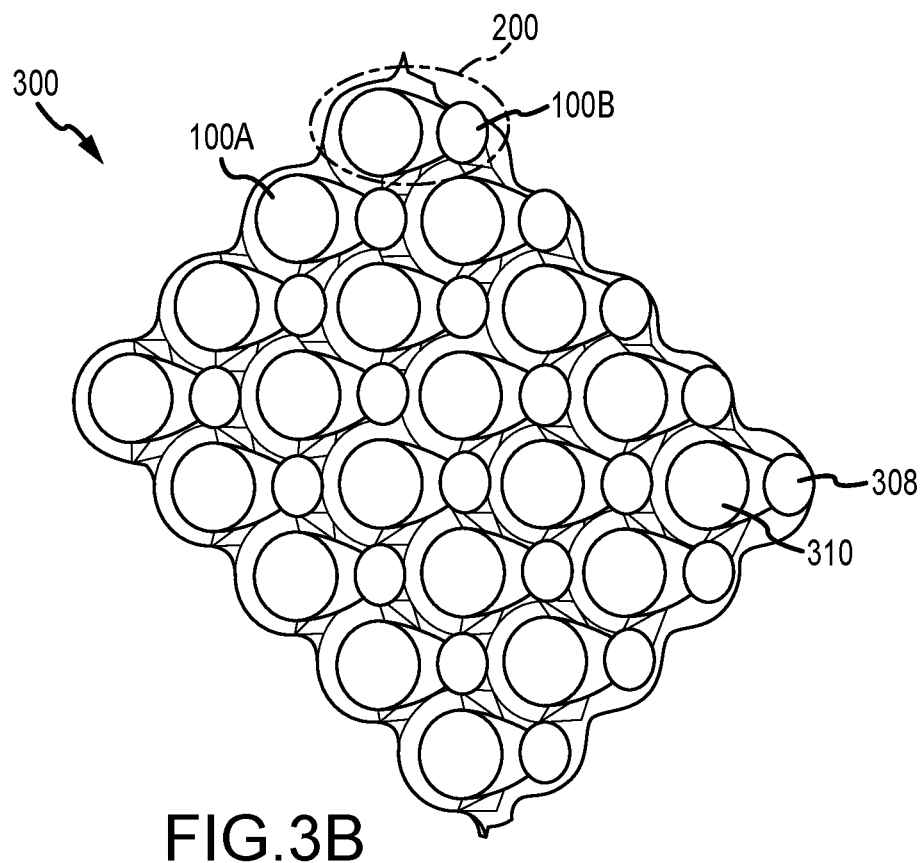
FIG. 3B is a top view of the single layer of FIG. 3A.

As shown in FIG. 3, a single layer structure 300 includes a number of unit cells 200 in a layer, which works like a sophisticated coil that allows for controlled, uniform, multidirectional compression and expansion (vertical, horizontal and any degree in between). Each unit cell 200 includes a pair of bowling pin structures 100A and 100B placed very close together. The outer surface layers of the single layer structure can be made of a series of domes which seal the wide and narrow ends or equal sized ends of each bowling pin structure. One end can be narrower and more round than the other end.

The two opposite surfaces 302 and 304 of the single layer structure 300 are made of a series of juxtaposed domes 116A and 116B, as shown in FIG. 1A. These domes constitute a very strong surface that can resist shock and withstand pressure at localized spots.

In the structure of FIG. 3, the single layer structure 300 is a laminated structure in a transverse plane perpendicular to the center plane. When the single layer structure 300 is viewed from the top surface, the single layer structure 300 includes a row 310 of wide ends of the bowling pin structures interleaved with a row 308 of narrow ends of the bowling pin structures. As such, the single layer structure 300 appears laminated by a first layer 308 of bowling pin structures interleaved by a second layer 310 of bowling pin structures oriented in opposite direction from that of the first layer. Therefore, the single layer structure is an anisotropic structure.

In alternative embodiments, the narrow end may have an equal size to the wide end (not shown).

Small vertical space may be retained around each bowling pin structure along the longitudinal axis for absorbing the deformation that surrounds pins. The space may be filled up to create more structural strength, or more resistance to deformation.

After compression, the single layer structure may return to the original shape after pressure is released. In other words, the structure may have a memory of the original shape. These characteristics of the bowling pin structure shape make the structure applicable for many functions and industries.

The bowling pin structures may have a round cross-section or a polygonal cross-section. The polygon may have as few as three sides as many as eighteen sides, or more, depending on the application. The bowling pin structures can be lined up side by side in as close as possible of an arrangement.

Figure 15A:
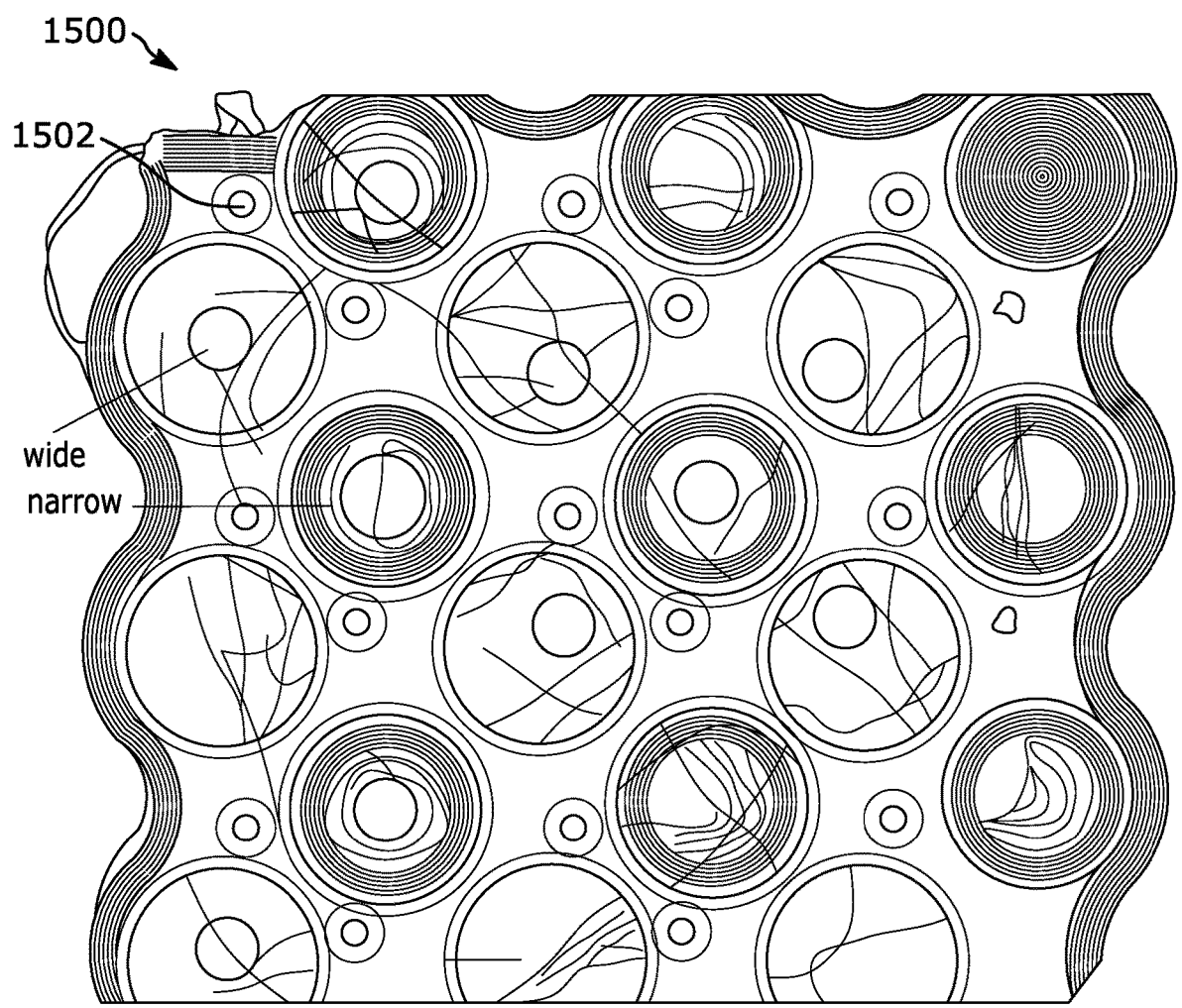
FIG. 15A is an optical image of a prototype of a single layer structure formed of pairs of single-wall bowling pin structures having space between the bowling pin structures.

The single layer structure may include spaces between the bowling pin structures for increasing shock absorption, for example, space 1502 as shown in FIG. 15A. When the sidewalls of the bowling pin structures of the single layer structure are compressed, the spaces between the bowling pin structures can be eliminated. In some embodiments, the spaces may be kept hollow to increase the compressibility of the structure. In other embodiments, the spaces may be filled with fillers, which may be selected to have the density appropriate to an application that requires high structural strength.

The empty space inside the bowling pin structures can be filled with air, gas, foam or gel. The durometer of the material can depend on the application. Generally, the higher the durometer of the fillers, the higher energy the structure can return, i.e. the structure is more bouncy. The softer the durometer of the fillers, the more energy the structure can absorb. The fillers may include foams, gels, or fluid including gas, air, oil or water among others.

The single layer structure can be flexible, elastic, and/or expandable. The properties can be due to the architecture of the surface, which can function like an accordion. The surface expansion may be determined by the tensile strength of the material used. The surface expansion and the structural integrity of the layer may prevent the air volume contained inside the layer from turning into a hard and bouncy volume, resulting from too much air in a small envelope. The surface expansion and the structural integrity of the layer may also prevent the layer from turning into a soft deflated volume, resulting from an envelope that is too elastic and thus creates a loss of volume integrity.

Figure 4:
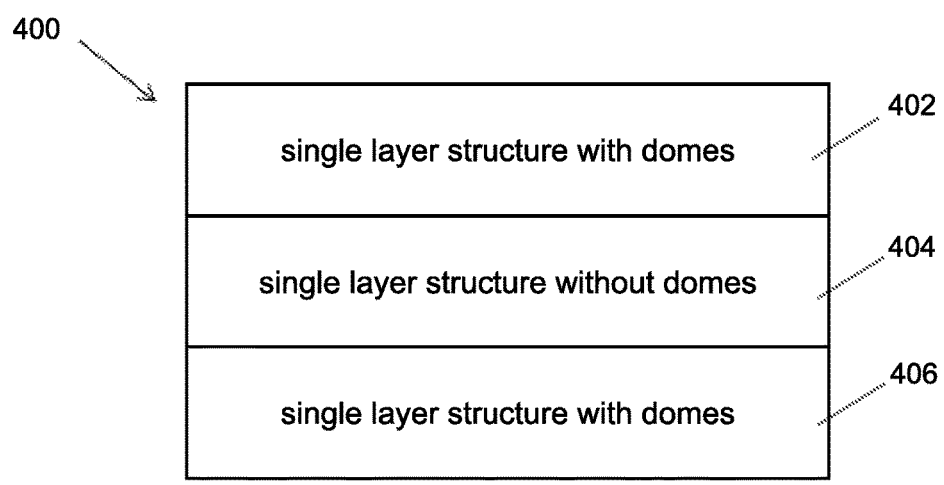
FIG. 4 illustrates three single structure layers with outer layers having domes for bowling pin structures in an embodiment of the disclosure.

In some embodiments, instead of the single layer structure, the structure may also be made of several layers, each layer including a series of bowling pin structures. A multilayer structure may be better than a single layer structure having the same thickness as the total thickness of the multilayer structure for shock absorption and strength. For example, several single layers of bowling pin structures may be attached together to build a stronger structure than a single layer structure with more depth. Specifically, a single layer structure 300 has a thickness of 1 T. As shown in FIG. 4, a multilayer structure 400 includes three single layers 402 and 406 and 404 with a total thickness of 3 T. The single layer structures 402, 404, and 406 may be formed first and then stacked together or joined together to form the multilayer structure 400. As shown in FIG. 4, each of a first outer layer 402 and a second outer layer 406 includes domes on the number of bowling pin structures on the outer surface of the multilayer structure 400. A middle inner layer 404 is placed between the first outer layer and the second outer layer, and includes a number of pairs of bowling pin structures without domes. The narrow or equal size ends of the bowling pin structures of one layer may be affixed or welded end-to-end with the narrow or equal size ends of the bowling pin structures of the next layer, while the wide-ends of the bowling pin structures of one layer may be affixed or welded end-to-end with the wide-ends of the bowling pin structures of the next layer. It will be appreciated by those skilled in the art that each of the outer layers 402 and 406 and inner layer 404 may vary in thickness.

Figure 3C:
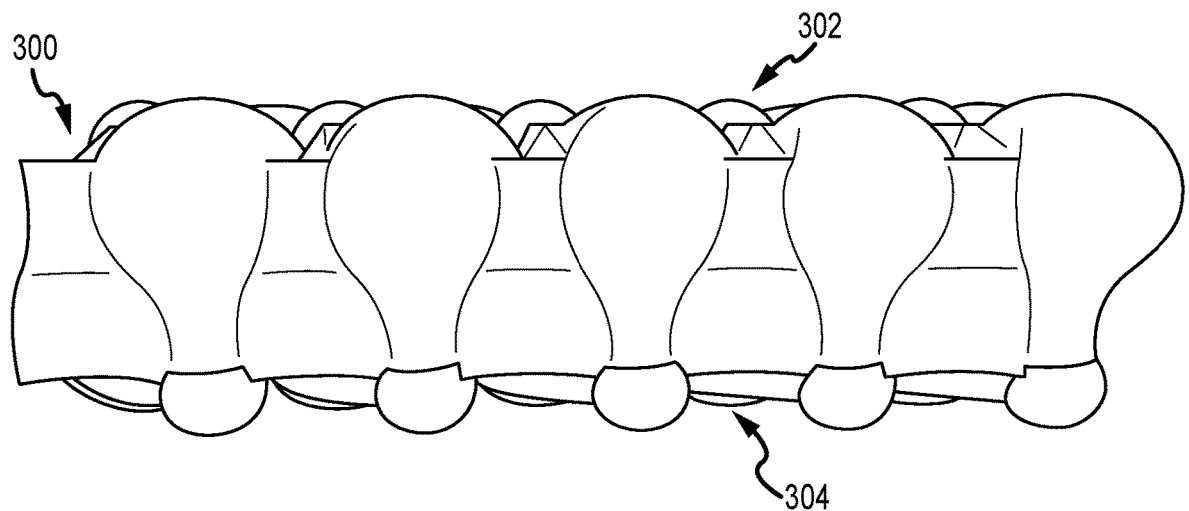
FIG. 3C is a side perspective view of the single layer of FIG. 3A.
Figure 5:
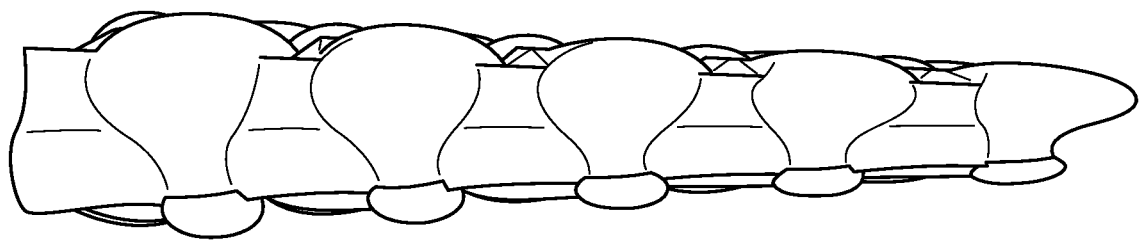
FIG. 5 is a side perspective view of a single layer structure having a wedge shape and including a number of bowling pin structures in a second embodiment of the disclosure
Figure 6:
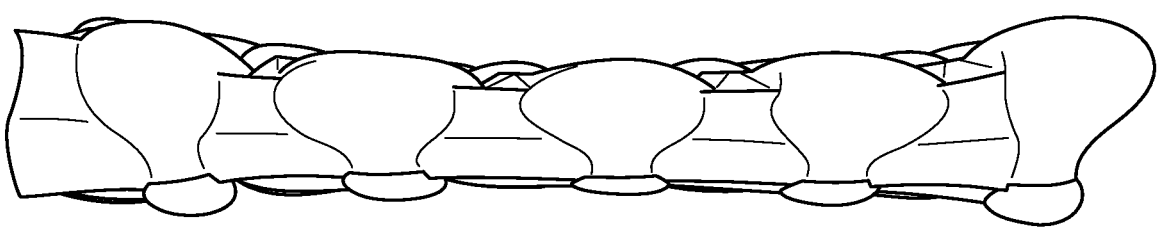
FIG. 6 is a side perspective view of a single layer structure having a concave north surface and a convex south surface including a number of bowling pin structures in a third embodiment of the disclosure.

The surface of the single layer structure can be curved to form any shape or series of shapes, such as flat shape (as shown in FIG. 3C or FIG. 5) or convex or concave shape (as shown in FIG. 6). For structures of various shapes, the pin height and shape may vary such that the structure may form an actual wedge shape. As shown in FIG. 5, the wedge is an effect of deformation by pressure. The wedge can be an actual wedge shape without any deformation effect. In another embodiment, the pin height and shape may vary to form a curved structure as shown in FIG. 6 with one concave surface and one convex surface. As shown in FIG. 6, the curved structure is an effect of deformation by pressure. The curved structure can be an actual curved shape without any deformation effect. In some embodiments, the pin height and shape may vary to form a curved structure with two concave surfaces. In alternative embodiments, the pin height and shape may vary to form a curved structure with two convex surfaces.

The structure may vary its functions in various places by having different depths. For instance, a wedge structure as shown in FIG. 5 may be used to make an airplane wing, which can include very acute angles θ with respect to the center plane for the bowling pin structures near the body of the airplane and very shallow layers near the extremities of the wing with more obtuse angles θ for a greater deflection of vibrations and more flexibility of the entire structure.

Shape variations in the bowling pin structures can be designed to meet any customized need and can be extruded accordingly. The durometer of the fillers, such as gels/foams, can also vary according to the location where it is used. For example, if the structure includes a single layer of bowling pin structures, each of the two surfaces of the single layer structure may include a series of domes that constitute a strong surface that can resist shock and deflect the shock waves or withstand pressure, one dome a time.

The single layer structure can be made of many materials, such as plastics, rubbers, metals, and cardboard, depending on the application.

Shape Conforming of Single Layer Structure Under Uniform or Non-Uniform Pressure The single layer structure can conform its surface to the shape of an applied object for pressure equalization. When the single layer structure is deformed, either statically by pressure or dynamically by shock, the bowling pin structures or individual cells in the middle of the curve is compressed into a concave shape until the individual cells become locked without any further deformation. The domes of the individual cells on the concave side, due to deformation, reach their maximum compression, while the individual cells on the convex side reaches their maximum expansion. This structural deformation is progressive and eventually creates a static vault lock, because the single layer structure cannot deform any further in the middle.

In some embodiments, the pressure may be uniform, as shown in FIG. 7. As shown in FIG. 7, uniform pressure 702 is applied to one surface of the single layer structure 700. The height of the bowling pin structure is reduced under pressure, compared to the ones shown in FIG. 3C.

Figure 8A:
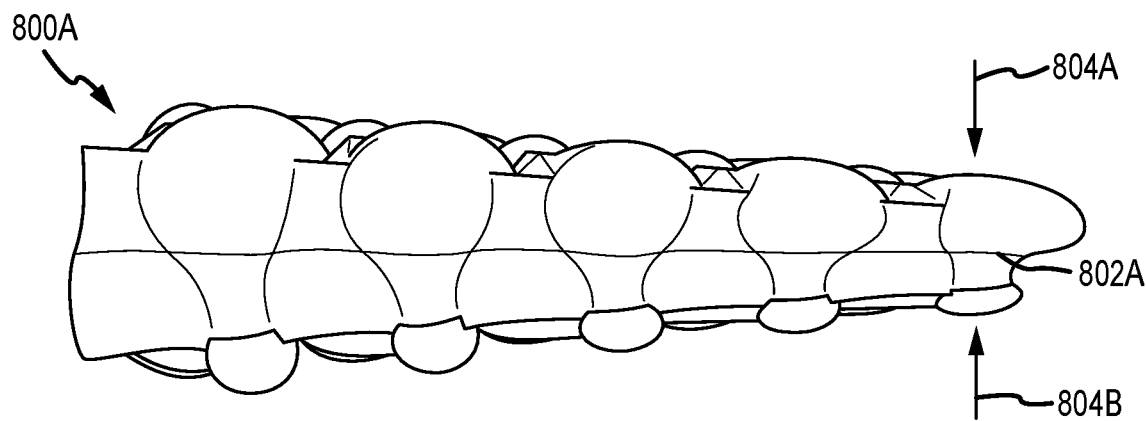
FIG. 8A is a side perspective view of the single layer of FIG. 4 after applying a compression near an end of the wedge perpendicular to the layer in an embodiment of the disclosure.
Figure 8B:
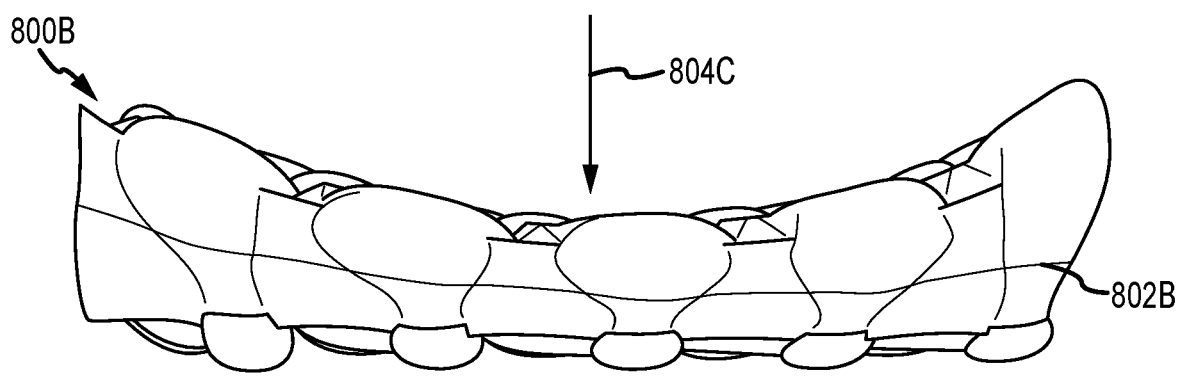
FIG. 8B is a side perspective view of the single layer of FIG. 4 after applying a compression near a middle of the single layer structure having a constant thickness in an embodiment of the disclosure.
Figure 8C:
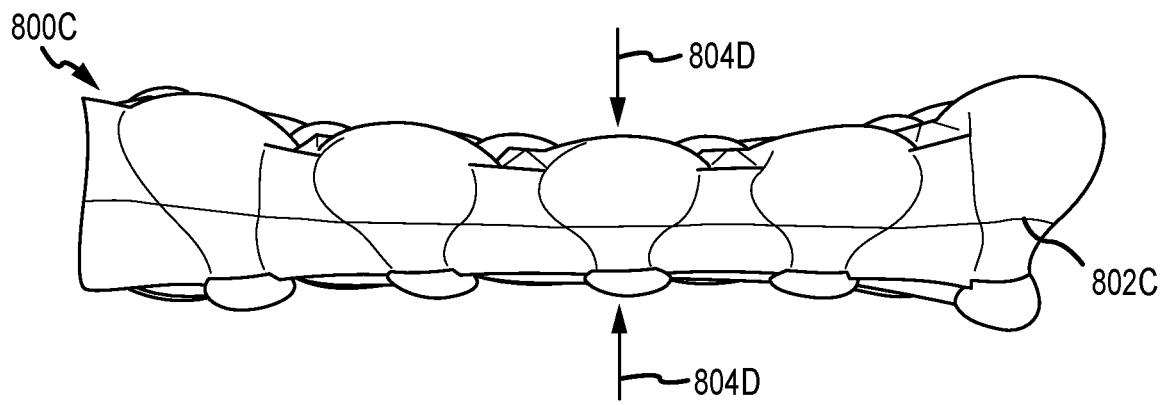
FIG. 8C is a side perspective view of the single layer of FIG. 4 after applying a compression near a middle of the single layer structure from both the north surface and the south surface in an embodiment of the disclosure.

In some embodiments, the force or pressure may be non-uniform, as shown in FIGS. 8A-8C. As shown in FIG. 8A, forces are applied as indicated by arrows 804A and 804B near the end of the structure 800A on opposite sides of the structure 800A. The center point 802A of the Vault Lock becomes a Dynamic Keystone Arch that will, when compressed to its structural limit, initiate the return of the individual cells to their original shapes. The center point 802A becomes a straight line by deforming the entire single layer structure under a shock or a local pressure.

As shown in FIG. 8B, a force 804C is applied near the center of the single layer structure 800B. The center point 802 of the Vault Lock becomes a Dynamic Keystone Arch that will, when compressed to its structural limit, initiate the return of the individual cells to their original shapes. The center point 802B becomes an arch by deforming the entire single layer structure under a shock or a local pressure. The arch is the key for the single layer structure to have its shape memory.

FIG. 8C shows that local forces 804C and 804D are applied to the single layer structure 800C from two opposite sides of the single layer structure 800C. The center point 802C is also an arch by deforming the entire single layer structure under a shock or a local pressure.

The result of a static pressure on such a single layer structure, as shown in FIGS. 8A-8C, is that the contact surface increases such that the derived pressure diminishes. The high pressure point is absorbed and the surrounding low pressure points are brought into contact, which helps distribute the load more evenly and create a greater contact surface.

The result of a major shock (a bomb blast for instance) is that at the point of impact, the individual cells can compress and create a progressive resistance to the force applied by (a) the compression of the cell walls, which will collapse into themselves at the rate determined by their thickness and structural degree of resistance, depending on the material used, and in which the sidewalls can be reinforced by a proportionally increased thickness to be at their thickest in the middle of each curve, depending on application; and/or (b) the exit rate of the fluid (e.g. air, gas, or liquid) contained into the surrounding cells, is determined by the number and size of the pin holes. The fluid exit can create an expansion in the surrounding cells that become elongated, and thus can create a secondary/delayed resistance to the initial shock. These elongated individual cells also can tend to regain their original shapes and push the fluid back into the individual cells that are originally compressed, and thus add strength and consistency to the memory capability of the structure itself.

Figure 9A:
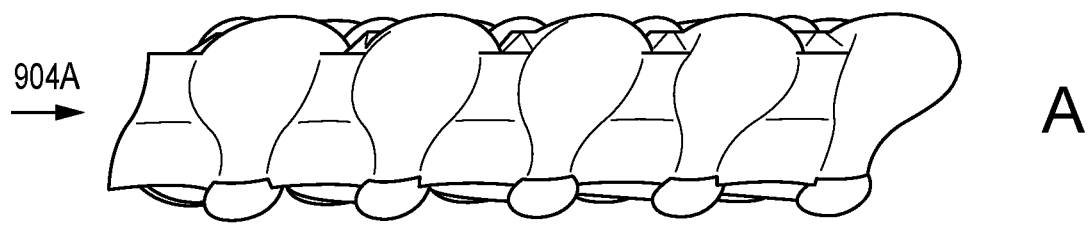
FIG. 9A is a side perspective view of the single layer of FIG. 4 after applying a small shear force in an embodiment of the disclosure.
Figure 9B:
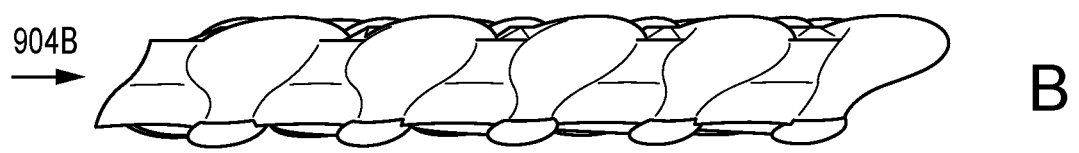
FIG. 9B is a side perspective view of the single layer of FIG. 4 after applying a slightly larger shear force than the embodiment of FIG. 9A.
Figure 9C:
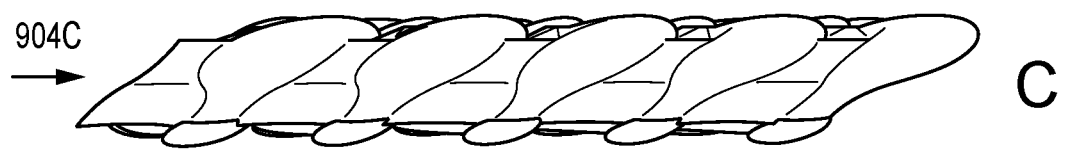
FIG. 9C is a side perspective view of the single layer of FIG. 4 after applying a larger shear force than the embodiment of FIG. 9B.

FIG. 9 shows a single layer structure sheared under various degrees. For example, structure 900A is sheared under a shear force 904A. Structure 900B is sheared under a shear force 904B, which is higher than the force 904A. Structure 900C is sheared under a shear force 904C which is higher than the force 904B, as evidenced by the smallest angle 902 from the center plane 103.

This shape memory can be further enhanced by a chemical memory of the fillers inside the individual cells or bowling pin structures.

Fillers

Fillers may include air, gases, fluids, gels, foams, among others, with various mechanical properties, such as shock absorption ability, compressibility, or long lasting rapid shape recovery. In other words, the structure can return to its original shape very quickly. The fillers may be integrated inside the bowling pin structures or may fill the space between the bowling pin structures, which enhances the performance of the single layer structure.

When the structure is compressed, the fluid fillers may flow into other regions through the pin holes, like water bed. For example, the fluid fillers may move from one bowling pin structure to another neighboring bowling pin structure through pin holes 1002 pierced on sidewall 110 between each individual cell as shown in FIG. 10, according to a principle of communicating vases. When a layer of bowling pin structures or individual cells with corresponding domes is built as an airtight volume and the domes of the bowling pin structures form a sealed envelope, fluid moves inside the layer through the pin holes in a controlled manner.

The traveling speed of a fluid (e.g. air, gas, or liquid) from one individual cell to another individual cell is determined by the size and number of the pin holes between the individual cells. The individual cells absorb/reduce the shock received when the single layer structure is under a direct external impact. The single layer structure can also diminish an applied static pressure by increasing the contact surface created from controlling vertical compression of the single layer structure. The progressive reduction of fluid volume inside the compressed individual cells increases the fluid volume in surrounding individual cells. For example, the cells closest to the compressed ones increase more than the cells furthest to the compressed ones. The expanded cells sustain the same pressure as the compressed cells through controlled vertical expansion due to increased fluid volume.

It will be appreciated by those skilled in the art that the size, shape, and number of pin holes may vary. The materials for the fillers may also vary.

Wire for Vibration Reduction and Conduction

The vibration dispersion system is made of spiral elongated members, such as filaments, threads, or wires. The elongated members have higher density than the individual cells. Each spiral elongated member provides an effective form of continuous vibration transmission over the length of the spiral elongated member. The wire may be coated for vibration reduction. Vibration control is created by a network/web of "wiring" made of a material of a higher density than the rest of the structure. This web can be placed on the outer surface of the structure or at any other level of the layer, but the web is arranged generally parallel to the layer.

In some embodiments, another spiral wire may be integrated near the center of the single layer, such as around the curves of the bowling pin structures, to absorb vibrations.

The spiral wire may include a coating or an encasing material, such as gel or foam, which may dampen the vibrations until the vibrations are completely eliminated. As shown in FIG. 11B, the wire 1102 includes a core 1104 coated with an outer layer 1106.

A series of spiral wires may be made of a variety of materials ranging from a single link design to a rigid but elastic material (such as a thread, wire or cable). The wires may be placed in a local spot. The wires may be placed flat on both surfaces of the layers of bowling pin structures. The wires may also be placed in the center or equator of the single layer structure and are covered with a layer of foam/gel, which has a slightly softer durometer than the one used inside the bowling pin structures.

The wires may vary in size, such as the diameter and length or coating thickness. The thickness of the outer layer 1106 may vary with the applications and may be chosen as a function of the degree of vibrations likely to occur during the use of the structure. The external diameter of these spirals may depend on the application and may also vary with the surface of the impact or the shock that is likely to occur. For example, the wider the surface of the shock, the longer the wire is to cover a wider region. The number of circles included in the spiral and the coating thickness of the wire and the diameter of the core 1104 may depend on the intensity and frequency of the vibrations to be dispelled.

The structure may include a network of radiating wires that may be formed of materials with high density and high thermal conductivity. The wire may crown the dome of each single cell and transmit the vibrations into the longer or larger diameter wire that meanders through all the domes. Small circles of wire placed on the section of each dome can be linked to the main spiral by radiating wire patterns. These radial patterns may increase the dispersion of the vibrations.

By using wires having high thermal conductivity, the single layer structure may improve its heat dissipation by thermal conduction through the wires.

The spiral 1102 can spread the load of the force very far from the point of impact in a wide and shallow curve of temporary deformation. The spirals encased on the surface opposite to the shock may disperse the remaining force and associated vibrations traveling through the structure.

The wires may be formed of any material with a higher density than the bowling pin structures, for high vibration conduction. For example, the wires may be made of steel, titanium, or nylon, among others. The wires may have a coating over a core to diminish vibration. It will be appreciated by those skilled in the art that the materials for the coating and core of the wires may also vary. The coating thickness of the wire or the dimensions (e.g. diameter or length) of the core may vary.

In one embodiment, shock creates vibrations of various frequencies that need to be dispelled and absorbed before the vibrations affect the solidity of the structure. The spiral on the north side of the structure (where a shock is applied) works like a spider web. The spiral conducts vibrations throughout its length. The gel/foam around the spiral dampens the vibration along its length. The vibration is reduced when the vibration travels through the surface of the spiral with the surrounding gel/foam encasing the core material along its length. The gel or foam creates an increased contact area of the spiral wire, and results in a greater and faster extinction of the vibration.

Combination of Mechanical Elasticity and Chemical Elasticity

In mechanical configurations, when a limited amount of pressure is applied, the same "hydraulic effect" can be achieved by using a flexible envelope made of a high shock absorption material, which is referred to chemical elasticity. Closed-cell foam can be used to encapsulate deformable, slow memory open-cell foams, which have slower shape recovery than the closed-cell foams. The air volume contained in the open cell foam inside the flexible envelope may be limited in order not to put the flexible envelope under too much pressure from the inside, so that the air volume does not reach a level that makes the flexible envelope hard to disable the flexible envelope to absorb shock. Conversely, the air volume contained in the flexible envelope must always be sufficient to prevent the flexible envelope from bottoming out.

When a ball is partly deflated, or a ball has an elastic envelope, the ball may not bounce and therefore absorb energy (e.g. shock absorption). On the other hand, when a ball is deflated too much, the ball may not offer any cushioning, because the ball may bottom out.

Figure 12:
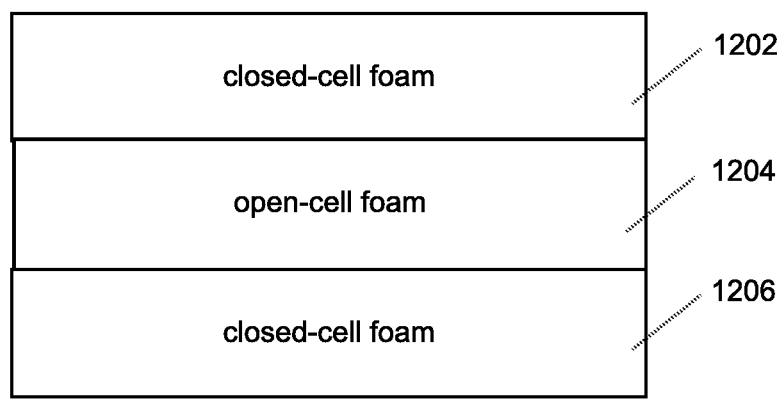
FIG. 12 illustrates a multilayer structure including closed cell foams and open cell foams in an embodiment of the disclosure.

As shown in FIG. 12, a multilayer structure 1200 may include three layers: two outer layers 1202A-B that are made of closed-cell foams, and one inner layer 1204 that is made of open-cell foams that have an envelope sealed by domes. The multilayer structure 1200 can perform similarly as the single layer structure 400, but at a less safe level because of the inherent weakness of the closed-cell foams in the outer layers.

The elasticity of the structure 1200 can be controlled. The volume limit of the envelope, when made of the series of domes, reaches its maximum when all the domes are substantially flattened out, which is referred to mechanical elasticity.

A combination of the mechanical elasticity (e.g. flattening the domes) with the chemical elasticity (e.g. expanding an elastic foam such as closed-cell foams) may enhance the performance of the multilayer structure. The top and bottom surfaces of the multilayer structure can be covered with closed-cell foams to combine mechanical elasticity with chemical elasticity. This multilayer structure 1300 combines mechanical and chemical shock absorption capabilities.

Fabrication Methods for Bowling Pin Structures

In some embodiments, the bowling pin structures may have a double-wall, such that the neighboring bowling pin structures do not share their sidewalls. The bowling pin structure may include a sheet 120 attached to the sidewall 110 of the bowling pin structure. In this double-wall configuration, the bowling pin structures can be made individually and then attached together. For example, the bowling pin structures may be first formed from a plastic material. Then, the bowling pin structures are linked together by either a gel acting as glue, of a compressible/extensible nature, so it can absorb a degree of flexion (compression or extension) without losing adherence by shearing itself from the structure.

Alternatively, the bowling pin structures may be made of metals or rigid materials. The bowling pin structures may be pushed up to their central transition portion 114 through a flexible central mesh to which the bowling pin structures are affixed by welding. Fillers, such as an elastic gel/glue, may fill up the entire space between the bowling pin structures on each side of the central mesh.

Figure 13:
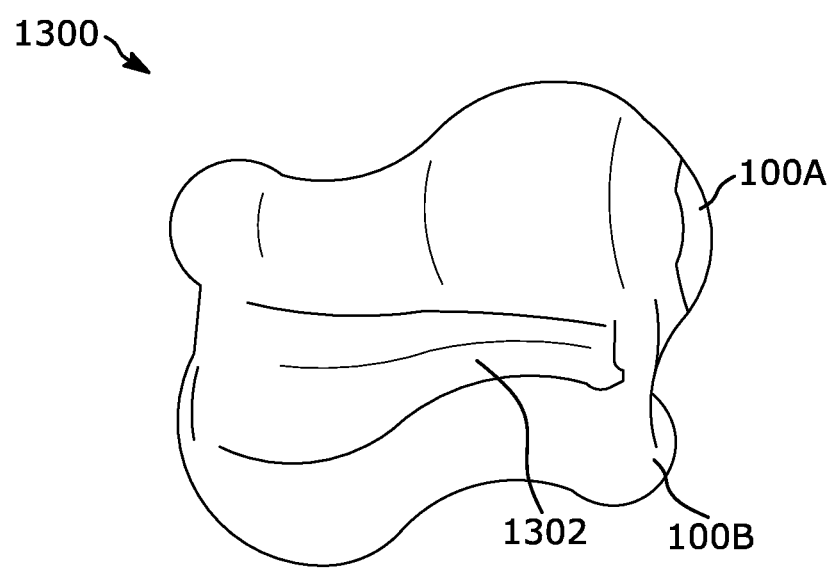
FIG. 13 is an optical image of a prototype of the unit cell of FIG. 2.

FIG. 13 is an optical image of a prototype of the unit cell of FIG. 2. The bowling pin structures 100A and 100B are double-wall type. The two bowling pin structures 100A and 100B are joined or connected by sheet 1302. The bowling pin structures include domes for sealing the sidewalls. The prototype of the unit cell is made of a hard plastic and is fabricated by 3D printing.

Figure 14A:
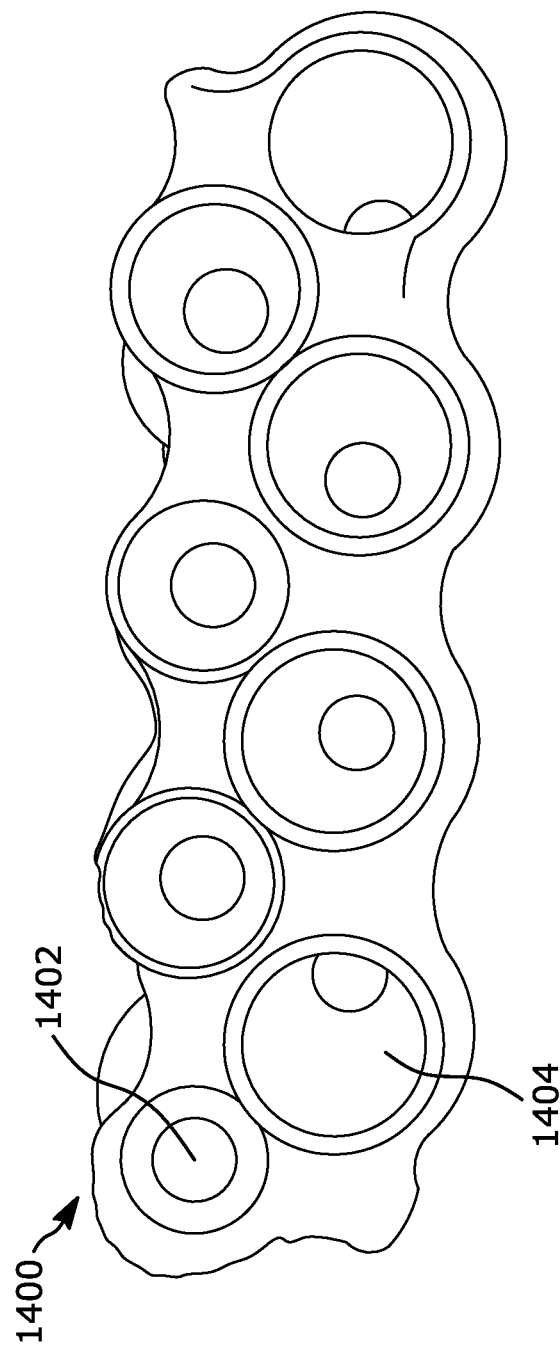
FIG. 14A is an optical image of a top view of a prototype of a single layer structure formed of pairs of double-wall bowling pin structures without domes.
Figure 14B:
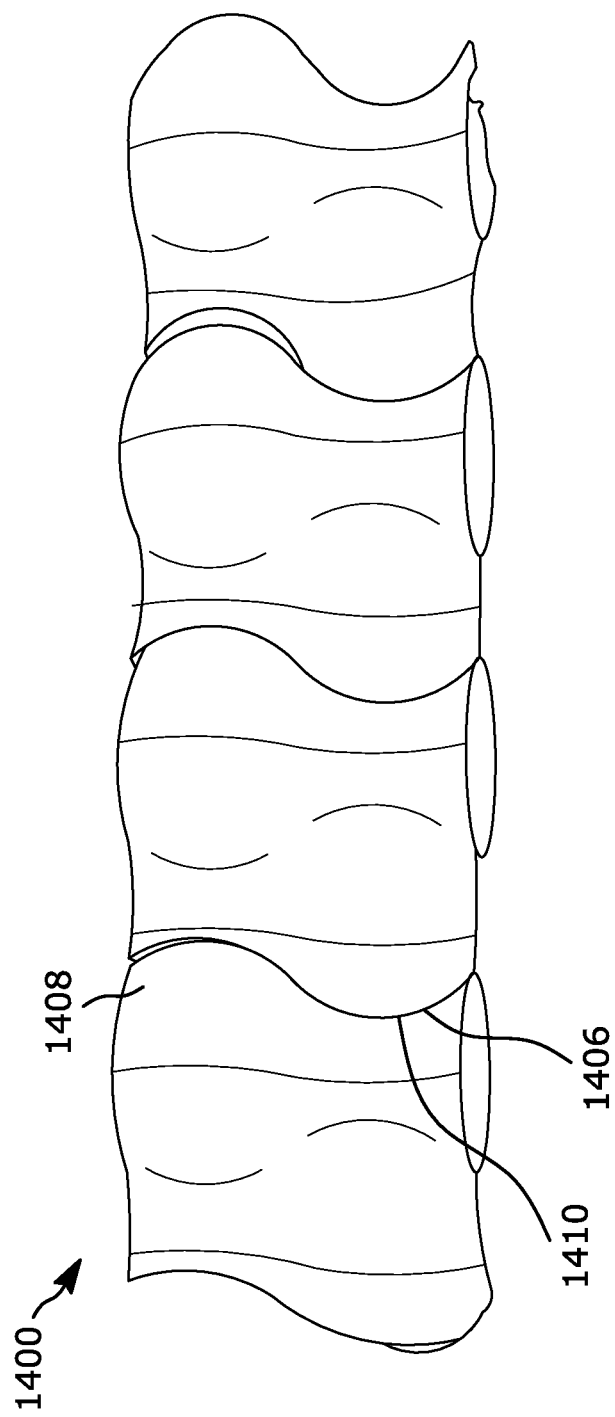
FIG. 14B is an optical image of a side view of the prototype of FIG. 14A.

FIG. 14A is an optical image of a top view of a prototype of a rigid single layer structure formed of pairs of double-wall bowling pin structures without domes. FIG. 14B is an optical image of a side view of the prototype of FIG. 14A. This single layer structure can be used as inner layer 404 as shown in FIG. 4. The prototype 1400 is formed of a hard plastic and is fabricated by 3D printing. As shown in FIG. 14A, the single layer structure 1400 includes a first row of bowling pin structures having wide open end 1404 and a second row of bowling pin structures having a narrow or equal size open end 1402. The two rows of bowling pin structures are connected together. This single layer structure 1400 does not have pin holes on sidewalls of the bowling pin structures or space between the bowling pin structures. The top surface and bottom surfaces of the single layer structure 1400 are flat and have no domes to seal the ends of the bowling pin structures. As shown in FIG. 14B, the connection line 1406 has an "S" shape that follows the convex portion 1408 and the concave portion 1410 of the sidewall, as viewed outside the structure 1400.

In some embodiments, the bowling pin structure may have a single-wall, such that the narrow or equal size end and the wide-end of the neighboring bowling pin structures share their sidewalls. A single layer structure includes a number of pairs of bowling pin structures or individual cells 100 or a number of unit cells 200 that can be fabricated by 3D printing or other methods.

Figure 15B:
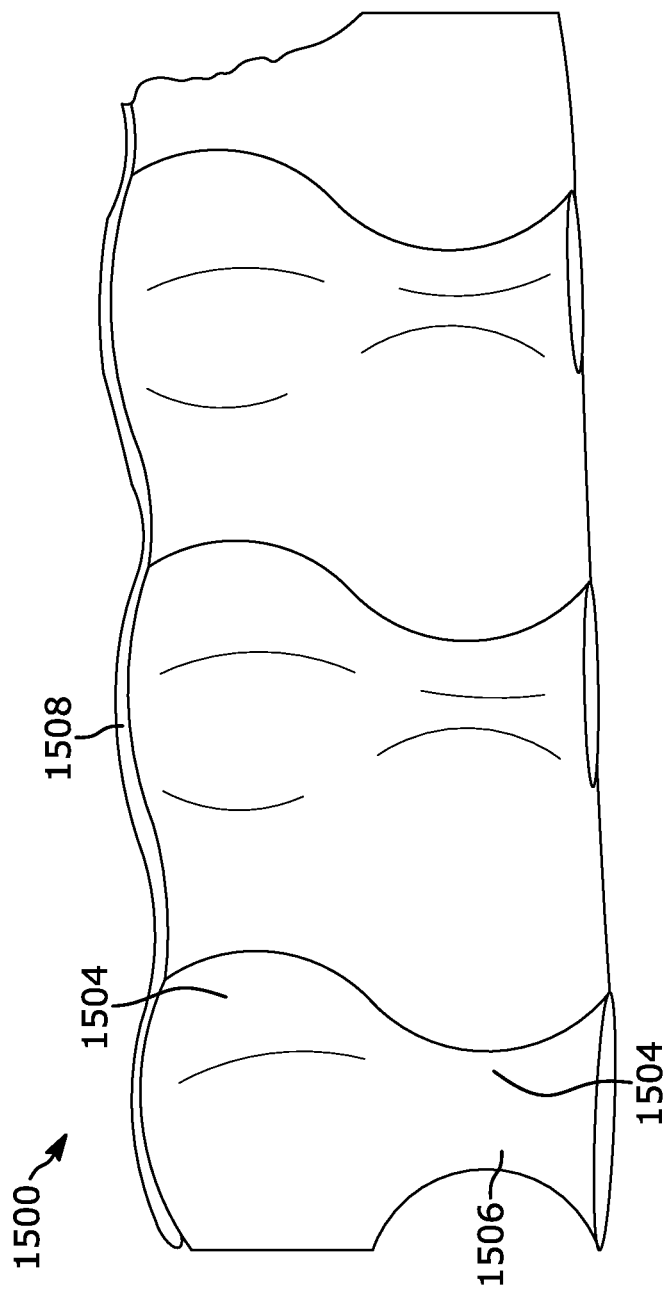
FIG. 15B is an optical image of a side view of the prototype of FIG. 15A illustrating pin holes on sidewalls of the bowling pin structures.

FIG. 15A is an optical image of a prototype of a soft single layer structure formed of pairs of single-wall bowling pin structures having space between the bowling pin structures. FIG. 15B is an optical image of a side view of the prototype of FIG. 15A, illustrating pin holes on sidewalls of the bowling pin structures. This single layer structure 1500 has vertical space 1502 between the bowling pin structures, as shown in FIG. 15A. The vertical space extends along a longitudinal or vertical axis 1508 that is perpendicular to the single layer structure. The single layer structure 1500 also has pin holes 1504 on sidewalls of the bowling pin structures. The pin holes 1504 are aligned along an axis transverse to the longitudinal axis 1508 or in a plane substantially parallel to a center plane 1506. The prototype is formed of soft foams and fabricated by 3D printing. The soft single layer structure may be suitable for more shock absorption.

Applications

The structure may be used for multiple purposes including: (1) being impervious to minor shocks; (2) absorbing large shock on impact, including bomb blasts and ammunition hits; (3) spreading pressure load on structures by absorbing high point of pressure while increasing contact surface on surrounding low points of pressure; (4) controlling temporary shape deformation of a semi-rigid structure such as car bodies or bumpers among others without limiting its shock absorption capability; (5) increasing the percentage of shape return (i.e. diminish permanent shape deformation) even after a strong shock (i.e. elasticity of structure), hence improving memory and longevity of structures (e.g. helmets and construction components); (6) limiting repairs costs and reduce frequency for repair; (7) controlling flexibility and energy return in function of the degree of shock or pressure applied to the structure; (8) reducing vibrations including noise reduction by conduction, dispersion, and dampening (drowning) of vibrations, such as for roads, tires, bridges, or buildings; (9) dissipating the heat from blasts and continuous friction, by offering a greater contact surface; (10) strengthening a given structure while allowing engineers to design structure components with less weight than existing structural architectures at reduced costs; (11) reducing fuel consumption in vehicles for transportation including cars, ships, airplanes, trains and increase longevity as a result of lighter weight and diminished vibrations while maintaining performance for the vehicles; and (12) reducing production costs by diminishing material fatigue or creep.

The applications of the structure, including a single layer structure and multilayer structures, may include saving lives, such as for military, transport, travel, construction—earthquakes and hurricanes, and improving health in sport related applications and daily protection. The applications may also include cost saving by enhancing longevity of structures and equipment. Specifically, the applications may include: (1) automotive (body, frame, bumpers, dashboards, doors); (2) aeronautics (plane construction, space travel); (3) rail (rails, rail support systems, railway cars); (4) roads and bridges (absorb car impact and vibration, lighter weight for bridges); (5) protection of engines and motors of all sorts from vibration for vehicles, ships, air conditioning equipment, or washing machines among others; (6) reinforcement for any kind of tires for cars, trucks, tractors, or heavy road machinery among others; (7) stronger, lighter hulls for military ships or submarines, commercial ships, private ships; (8) construction materials for tall buildings, floors, ceilings, support walls, earthquake prevention; (9) soles for shoes and boots for increased human comfort, such as sport shoes, work boots, or dress shoes among others; (10) body armor including helmets for military, sports, motorcycling among others; (11) packaging material with reduced weight and fuel consumption, or enhanced protection; (12) horse shoes (absorbing shock, maintaining flexibility, facilitating application); (13) sport equipment including body protection armor, skis and poles, snowboards, skateboards, tennis rackets, golf clubs, saddle trees, or riding whips among others; and (14) artillery equipment including guns of various sizes are subjected to recoil or backward shock, and also vibrations. The structure may be used in the walls of the barrel of the gun and/or in the butt of the gun, which may greatly disperse shock and vibration. Also, the filler may include a relatively soft metal (e.g. aluminum), while the bowling pin structure may be made of a harder metal (e.g. steel).

The disclosed bowling pin structures may be used in a cross-country fence having horse/rider protection features. A horse rider may jump over a series of obstacles, such as fences, during a cross-country run. Accidents often occur to horses and riders during the jumps over the fences. In particular, the horse may have "rotational falls" in which the front legs of the horse are temporarily blocked by any part of the obstacle or fence. The horse may pivot against the obstacle, or fence. The rider may fall off the horse, resulting in injury. The horse may fall on top of the rider during the accident, which may cause serious injury and even death to the rider.

Figure 16A:
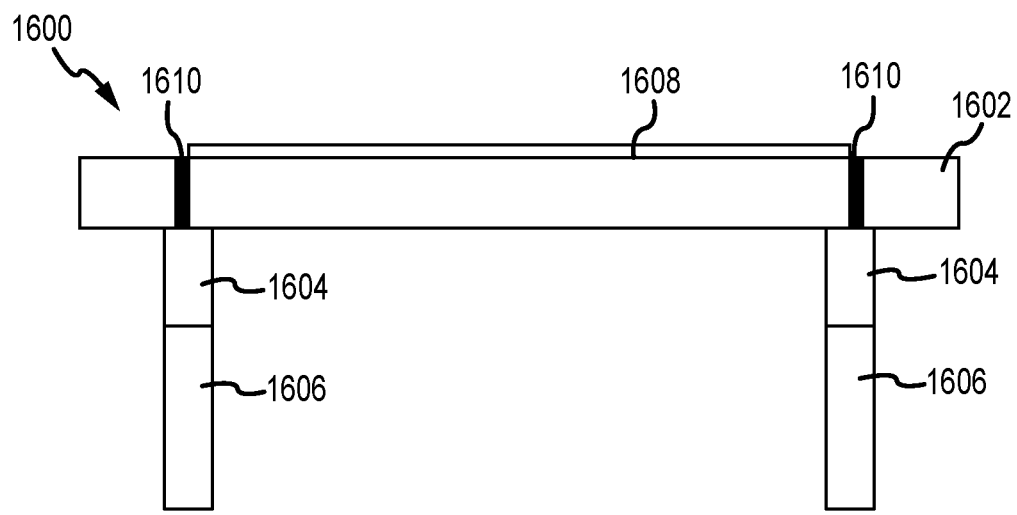
FIG. 16A is a front view of a fence including horse/rider protection features in an embodiment of the disclosure.

FIG. 16A is a front view of a cross-country fence including horse/rider protection features in an embodiment of the disclosure. A fence 1600 may include two end support members or posts 1606, two support shelf members 1604, and a rail 1602 having two opposite ends. The posts 1606 may stand vertically on the ground and are spaced apart by a fixed distance. The rail 1602 is positioned horizontally, having its ends supported by the shelf members 1604, which are attached to respective posts 1606. The rail 1602 may be attached to the shelf members 1604 and posts 1606. For example, the rail 1602 may be attached to the shelf members 1604 and the posts 1606 by using respective ropes 1610 which wrap around the rail, respective posts and shelf members. The posts may be shaped like a beam and have circular cross-sections or other shaped cross-sections.

In some embodiments, the rail 1602, posts 1606, and shelf members 1604 may be made of wood. In other embodiments, the rail, posts, and shelf members may be made of composite material, polymer, or metals among others.

Figure 16B:
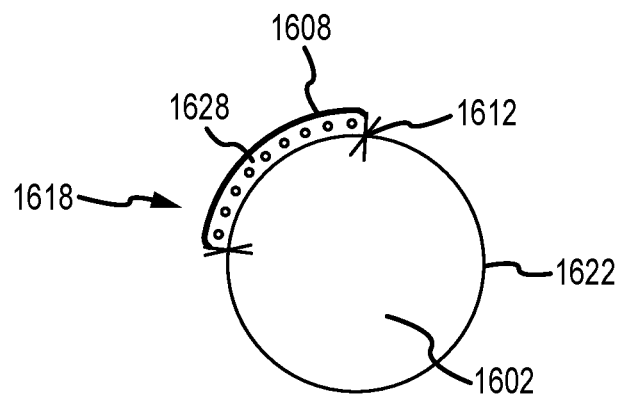
FIG. 16B is a side view of the rail of the fence of FIG. 16A.

The fence 1600 may include several horse/rider protection features. A first horse/rider protection feature covers the rail with a low friction fabric and a strip to provide both slipperiness and shock absorption. FIG. 16B is a side view of the rail of the fence of FIG. 16A. As shown in FIG. 16B, a low friction fabric 1608 partially covers the outer surface 1622 of the rail 1602. The fabric may face the forward direction 1618 in which the horse moves toward the fence 1600. The fabric 1608 is attached to the rail 1602. For example, the fabric 1608 may be secured to the rail 1602 by using staples 1612.

A strip 1628 may also be placed between the rail 1602 and the low friction fabric 1608 for shock absorption. The strip 1628 may be formed of a high shock absorption polymer or foam. The strip 1628 and the fabric 1608 are attached to the outer surface 1622 of the rail 1602. For example, the fabric 1608 and strip 1628 may be secured to the rail 1602 by staples 1612.

Figure 16C:
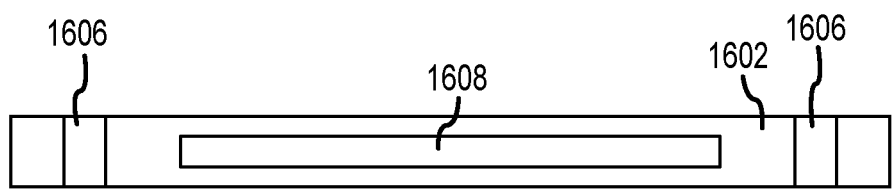
FIG. 16C is a top view of the rail including a low friction fabric of FIG. 16B.

FIG. 16C is a top view of the rail including a low friction fabric of FIG. 16B. As shown in FIG. 16C, the fabric 1608 covers a top portion of the outer surface 1622 of the rail 1602 between the posts 1606. The top portion of the rail covers the potential area that the horse may hit during its jump. When the rail 1602 is hit during the jump of the horse, the fabric 1608 may help reduce the friction and thus likely facilitate the passage of the horse.

Figure 16D:
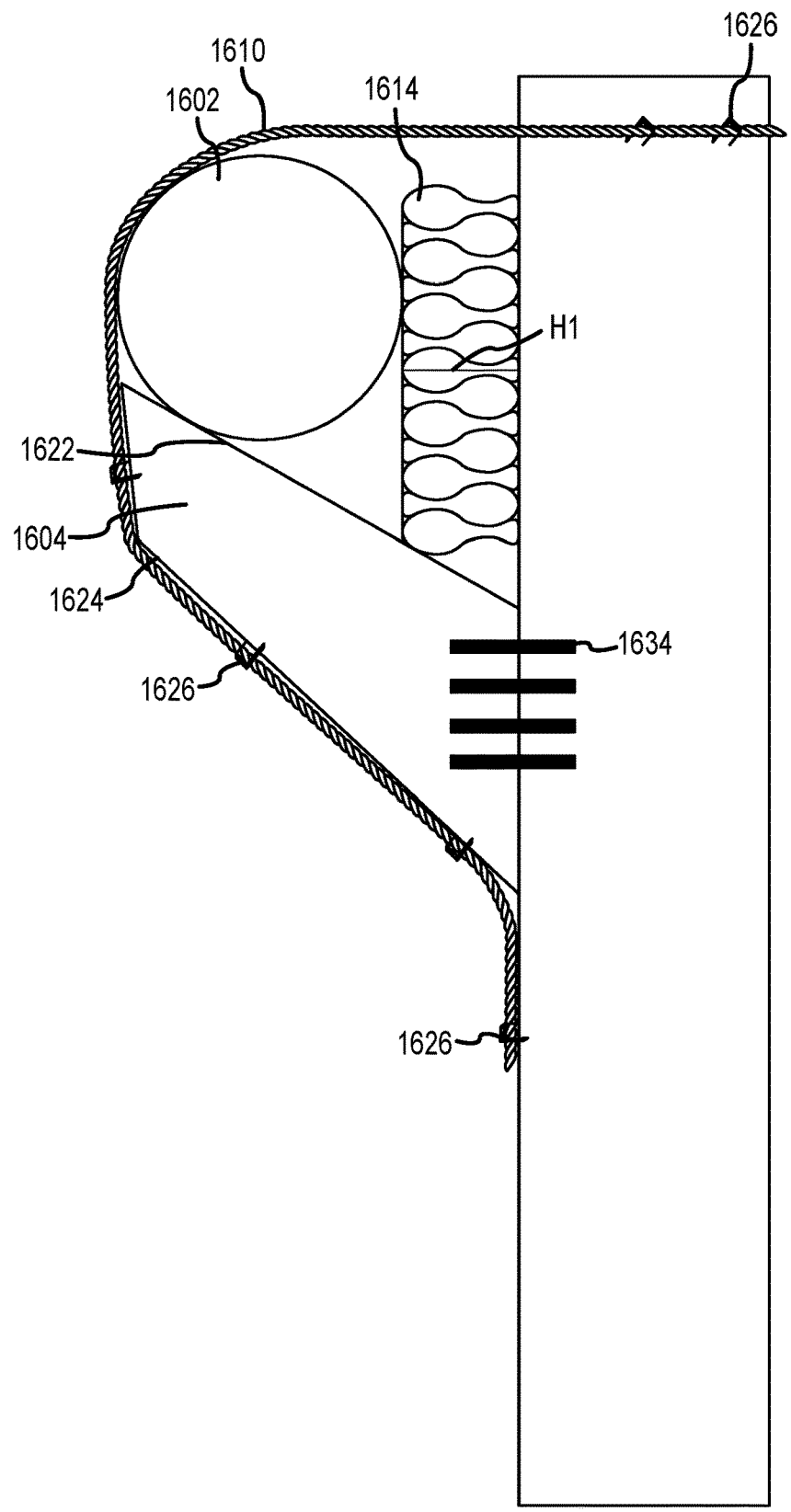
FIG. 16D is a side view of the fence including horse/rider protection features of FIG. 16A.

The fence 1600 may also include a second horse/rider protection feature to create a forward mobility of the rail. The mobility may be restricted to a small degree. FIG. 16D is a side view of the fence including horse/rider protection features of FIG. 16A. The fence 1600 may include a shape memory member 1614 between the rail 1602 and the post 1606 that holds the shelf member 1604. The shape memory member may be a shock absorbing structure for shock absorption. The rail 1602 is placed on top of the shelf member 1604. The shape memory member or shock absorbing structure 1614 may compress and recover its shape quickly such that the profile of the fence or jump is not permanently affected. This shape recovery feature is very important because the shape recovery feature maintains the profile of the jump for next competitor and allows the competition to continue smoothly without the time consuming intervention from the jump construction crew.

In some embodiments, the shock absorbing structure 1614 may be formed of the single layer structure as disclosed, such as shown in FIGS. 3A-3C or FIGS. 15A-B. In some embodiments, the shock absorbing structure 1614 may be formed of multiple layer structure, such as shown in FIGS. 4 and 12. In some embodiments, the shock absorbing structure 1614 may be any other shape memory member known in the art.

The shock absorbing structure 1614 may be shaped as a plate with a height or thickness labeled as $H_1$. In some embodiments, the plate may be at least 1 inch thick. In some embodiments, the plate may be 2 inches thick. In some embodiments, the plate may be 3 inches thick. In some embodiments, the plate may be 4 inches thick. In some embodiments, the plate may be 5 inches thick.

The fence 1600 may also include a third horse/rider protection feature to create a downward mobility of the rail. The shelf member 1604 may have an upper surface 1622, which has a downward slope toward the joint 1634 between the shelf member and the post. The shelf member and the post may be attached by using fasteners, such as nails among others.

The downward slope of the upper surface 1622 allows the rail 1602 to slide in the same direction when the shock absorbing structure 1614 is compressed during the horse jump. When the shock absorbing structure 1614 is compressed, the rail 1602 moves downward temporarily to help the passage of the horse during its jump. The downward movement of the rail 1602 makes it easier for the horse to pass its legs over the rail 1602.

The shelf member 1604 may also have a lower surface 1624 which has a downward slope toward the joint 1634 between the shelf member and the post. The lower surface of the shelf member 1604 may be designed to be easily wrapped and attached with rope 1610.

The rope 1610 wraps around the post near the top. The rope 1610 also wraps around the outer surface of rail and the shelf member. The rope 1610 is attached to the shelf member and the post such that the rail is secured to the shelf member. Various means may be used for securing the rope 1610. For example, a number of staples 1626 may be used to fasten the rope to the shelf member and the post to secure the rail.

It will be appreciated by those skilled in the art that any flexible fastening device may be used to replace the rope. For example, the flexible fastening device may include ribbons, cables among others.

Figure 17:
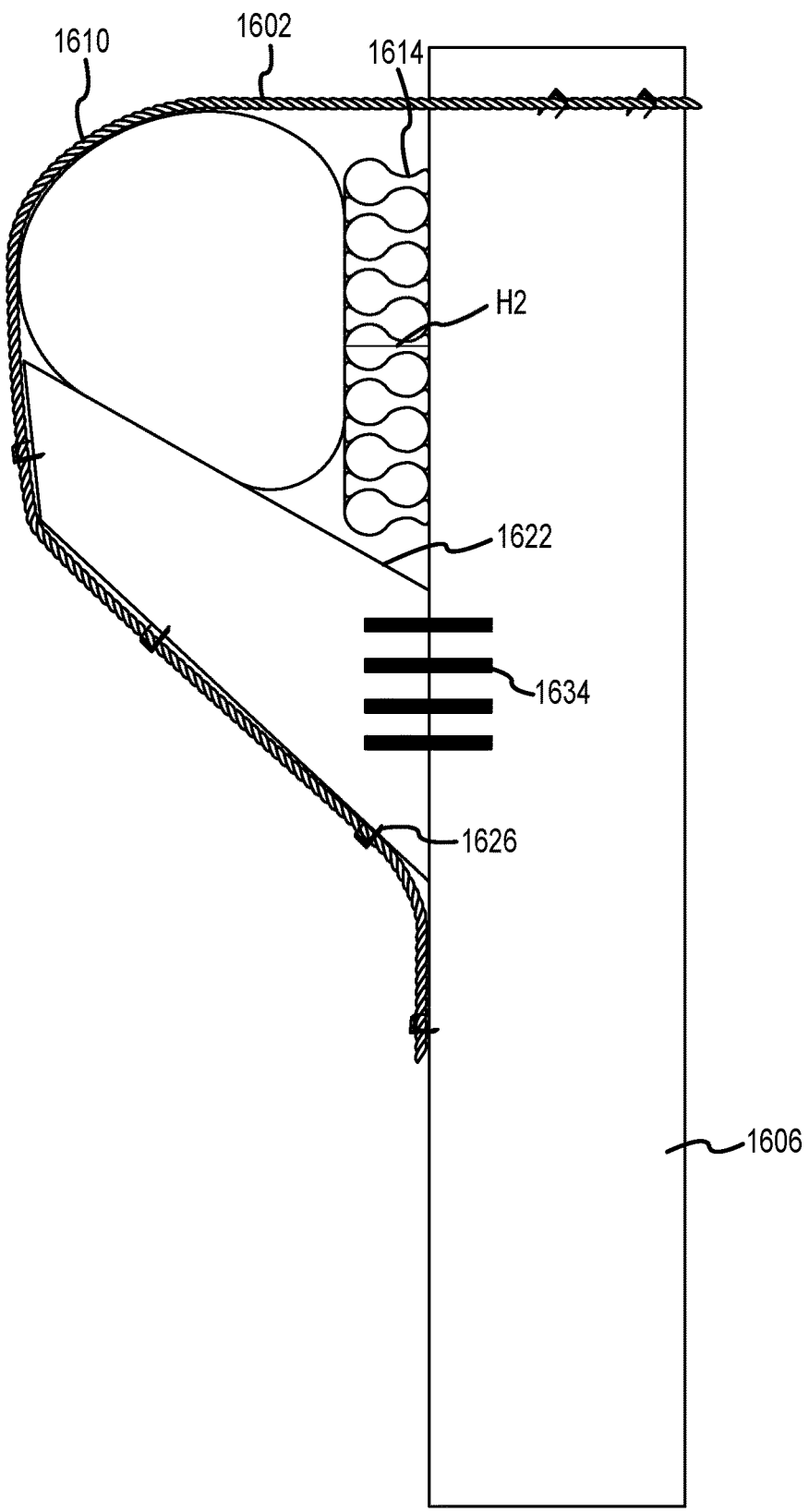
FIG. 17 is a side view of the fence of FIG. 16D after the rail being hit by horse leg in an embodiment of the disclosure.

FIG. 17 is a side view of the fence of FIG. 16D after the rail has been hit by a horse leg in an embodiment of the disclosure. As shown, the horse hits the rail with a forward force F1 toward the rail 1602. The shock absorbing structure 1614 is then compressed between the rail 1602 and the post 1606 by the force F1 to have a height or thickness $H_2$, such that the rail 1602 moves downward along the sloped upper surface 1622 by gravity. For example, the rail 1602 may suddenly lower its height by a few inches and then be recovered to its original height quickly.

It will be appreciated by those skilled in the art that the sudden drop in height may vary with the dimension, design, and material of the shock absorbing structure. The drop height may also vary with the force. It will be appreciated by those skilled in the art that the shape, dimension, and material of the rail, the shelf member, and the shock absorbing structure may vary to be suitable for any particular application.

The combination of the first, second, and third horse/rider protection features can modify the downward and forward profile of the rail, absorb shock, and lower the friction against the rail, and thus protect the horse and rider by eliminating falls or reducing frequency of falls or limiting gravity of falls. These protection features may help facilitate the passage of the horse over the rail in a way sufficient to extend its front legs prior to landing on the ground. The horse/rider protection features may reduce the risk of the horse falling over the cross country fence and hurting the rider.

EXAMPLE 1

In some embodiments, the shock itself can deform the structure. When the shock hits the structure on the north surface or top surface, as shown in FIG. 8B by force 804C, the shock may be absorbed in several different ways.

First, the spiral on the south surface or bottom surface acts as a net, because the spiral is not under tension, just like a spider web catching a fast flying prey. The vibration is progressively dampened by the gel encasing the spiral.

Second, the shape of the individual cells creates a series of curves that deviate from a directly applied vertical force from the north surface of the structure. The sidewalls of the bowling pin structures derivate the force and absorb a great portion of the force. The three dimensional (3D) "S" shape of the bowling pin structure takes a degree of deformation itself.

Third, the fillers, such as air, gel, or foam, inside the bowling pin structures act as a dampener for the shear force through the sidewalls of the bowling pin structures.

Fourth, any force, such as a shock or a pressure, applied to the single layer structure at any angle, forms a concave surface under the shock or the pressure, which is referred to as a reverse Keystone Effect. The entire single layer structure bends inward under the force. The greater the deformation, the more the single layer structure is compressed and the more the structure resists the force. It locks itself progressively. The narrow or equal size ends and the wide ends of the bowling pin structures are squeezed together on the concave side, which in turn compresses the fillers, such as air, gel, or foam. The more the structure is deformed, i.e. the deeper the impact is, the stronger the structure becomes as a result of the reverse Keystone effect, while the single layer structure still ensures its general integrity.

The further inward the surface moves (i.e. more concavity), the more concave the surface becomes and takes the shape of a vault 802B, and the central elements of the curve react by producing a reverse dynamic Keystone Effect and makes the structure progressively stronger. Eventually, the structure locks up and starts to return the energy outward and thus recover to its original shape. The forceful extension of the vault also contributes to the shape memory of the structure.

In contrast, a traditional honeycomb structure creates a Keystone effect, such that a curve is locked between two other elements and redirects a force applied to its apex (usually vertical gravity) into two opposite forces moving away laterally.

If the south surface or bottom surface of the single layer structure is convex toward the incoming shock as shown in FIG. 8C, the Keystone effect works in reverse and prevents the initial deformation, leaving the shock absorption role to the bowling pin structures and the fillers in the structure, such as gels.

If the south surface or bottom surface of single layer structure is concave toward the incoming shock as shown in FIG. 8B, the Keystone effect is already in effect, such that the structure is strong.

EXAMPLE 2

In order to accommodate curves in the design of an object, the structure may be made of at least two single layer structures, including a concave layer and a convex layer, with the concave layer being deeper and having larger angles $\theta$ with respect to the center plane for more strength. The convex layer can be shallower with smaller angles $\theta$ with respect to the center plane for more deflection of shock force and vibration.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall therebetween.

What is claimed is:

1. A single layer structure comprising:
   a plurality of unit cells arranged in a single layer, each unit cell comprising:
   a first bowling pin structure interlocked with a second bowling pin structure arranged in an opposite orientation to the first bowling pin structure,
   the first bowling pin structure having a first sidewall, a first wide end, and an opposing first narrow or equal size end, the second bowling pin structure having a second sidewall, a second wide end, and an opposing second narrow or equal size end,
   wherein each of the bowling pin structure has a center axis along a longitudinal or vertical axis of the single layer structure, the first and second sidewalls configured to have a 3D "S" shape along the longitudinal or vertical axis such that each of the first wide end and the second wide end has a convex shape and each of the first narrow or equal size end and the second narrow or equal size end has a concave shape, wherein each of the first and second bowling pin structure comprises a plurality of holes in the sidewall.

2. The single layer structure of claim 1, wherein the first wide end of the first bowling pin structure is connected to the second narrow or equal size end of the second bowling pin structure by a first portion of connecting sheet, and the first narrow or equal size end of the first bowling pin structure is connected to the second wide end of the second bowling pin structure by a second portion of the connecting sheet.

3. The single layer structure of claim 1, further comprising an elongated member integrated with the single layer structure for vibration control.

4. The single layer structure of claim 3, wherein the elongated member comprises a wire having a core and an outer layer surrounding the core.

5. The single layer structure of claim 4, wherein the core comprises a metal and the outer layer comprises a polymer.

6. The single layer structure of claim 1, wherein the holes are aligned along a transverse axis to the longitudinal or vertical axis.

7. The single layer structure of claim 1, wherein the structure comprises a vertical hole extending along the longitudinal or vertical axis between the first bowling pin structure and the second bowling pin structure.

8. The single layer structure of claim 1, wherein each of the first bowling pin structure and the second bowling pin comprises a respective dome at the corresponding end.

9. The single layer structure of claim 1, wherein the single layer structure is a laminated structure when viewed from a top surface or a bottom surface, the single layer structure comprising a row of wide ends interleaved with a row of narrow or equal size ends.

10. The single layer structure of claim 1, wherein the first bowling pin comprises a foam material.

11. The single layer structure of claim 1,
wherein the first bowling pin structure has a hollow portion inside the first sidewall,
wherein the second bowling pin structure has a hollow portion inside the second sidewall, and
wherein at least one of the first hollow portion and second hollow portion comprises a filler.

12. The single layer structure of claim 11, wherein the fillers comprise a material selected from a group consisting of gases, liquids, gels, and foams.

13. The single layer structure of claim 1, wherein the single layer structure has a shape memory.

14. The single layer structure of claim 1, wherein each of the first and second sidewall surrounds a hollow portion.

15. A multilayer structure comprising two or more single layer structures of claim 1.

16. A fence with horse/rider protection features, the fence comprising:
a rail having a first end and a second end supported by first and second support shelf members,
the first and second support shelf members being attached to respective first and second end support members;
first and second shape memory members between the rail and the respective end support members, the shape memory members being positioned on the upper surfaces of the support shelf members.

17. The fence of claim 16, further comprising a fabric covering at least a portion of the rail between the first and second support shelf members.

18. The fence of claim 16, wherein the upper surface of each of the first and second support shelf members comprises a downward slope toward the joint between the support shelf member and the end support member.

19. The fence of claim 16, wherein the shape memory member comprises a single layer structure comprising:
a plurality of unit cells arranged in a single layer, each unit cell comprising:
a first bowling pin structure interlocked with a second bowling pin structure arranged in an opposite orientation to the first bowling pin structure,
the first bowling pin structure having a first sidewall, a first wide end, and an opposing first narrow or equal size end, the second bowling pin structure having a second sidewall, a second wide end, and an opposing second narrow or equal size end,
wherein each of the bowling pin structure has a center axis along a longitudinal or vertical axis of the single layer structure, the first and second sidewalls configured to have a 3D "S" shape along the longitudinal or vertical axis such that each of the first wide end and the second wide end has a convex shape and each of the first narrow or equal size end and the second narrow or equal size end has a concave shape.

20. A single layer structure comprising:
a plurality of unit cells arranged in a single layer, each unit cell comprising:
a first bowling pin structure interlocked with a second bowling pin structure arranged in an opposite orientation to the first bowling pin structure,
the first bowling pin structure having a first sidewall, a first wide end, and an opposing first narrow or equal size end, the second bowling pin structure having a second sidewall, a second wide end, and an opposing second narrow or equal size end,
wherein each of the bowling pin structure has a center axis along a longitudinal or vertical axis of the single layer structure, the first and second sidewalls configured to have a 3D "S" shape along the longitudinal or vertical axis such that each of the first wide end and the second wide end has a convex shape and each of the first narrow or equal size end and the second narrow or equal size end has a concave shape, and
wherein the structure comprises a vertical hole extending along the longitudinal or vertical axis between the first bowling pin structure and the second bowling pin structure.

21. The single layer structure of claim 20, wherein the first wide end of the first bowling pin structure is connected to the second narrow or equal size end of the second bowling pin structure by a first portion of connecting sheet, and the first narrow or equal size end of the first bowling pin structure is connected to the second wide end of the second bowling pin structure by a second portion of the connecting sheet.

22. The single layer structure of claim 20, further comprising an elongated member integrated with the single layer structure for vibration control.

23. The single layer structure of claim 22, wherein the elongated member comprises a wire having a core and an outer layer surrounding the core.

24. The single layer structure of claim 23, wherein the core comprises a metal and the outer layer comprises a polymer.

25. The single layer structure of claim 20, wherein each of the first bowling pin structure and the second bowling pin comprises a respective dome at the corresponding end.

26. The single layer structure of claim 20, wherein the single layer structure is a laminated structure when viewed from a top surface or a bottom surface, the single layer structure comprising a row of wide ends interleaved with a row of narrow or equal size ends.

27. The single layer structure of claim 20, wherein the bowling pin comprises a foam material.

28. The single layer structure of claim 20,
wherein the first bowling pin structure has a hollow portion inside the first sidewall,
wherein the second bowling pin structure has a hollow portion inside the second sidewall, and
wherein at least one of the first hollow portion and second hollow portion comprises a filler.

29. The single layer structure of claim 28, wherein the fillers comprise a material selected from a group consisting of gases, liquids, gels, and foams.

30. The single layer structure of claim 20, wherein the single layer structure has a shape memory.

31. The single layer structure of claim 20, wherein each of the first and second sidewall surrounds a hollow portion.

32. A multilayer structure comprising two or more single layer structures of claim 20.

33. A single layer structure comprising:
a plurality of unit cells arranged in a single layer, each unit cell comprising:
a first bowling pin structure interlocked with a second bowling pin structure arranged in an opposite orientation to the first bowling pin structure,
the first bowling pin structure having a first sidewall, a first wide end, and an opposing first narrow or equal size end, the second bowling pin structure having a second sidewall, a second wide end, and an opposing second narrow or equal size end,
wherein the first bowling pin structure has a hollow portion inside the first sidewall,
wherein the second bowling pin structure has a hollow portion inside the second sidewall,
and wherein at least one of the first hollow portion and second hollow portion comprises a filler;
wherein each of the bowling pin structure has a center axis along a longitudinal or vertical axis of the single layer structure, the first and second sidewalls configured to have a 3D "S" shape along the longitudinal or vertical axis such that each of the first wide end and the second wide end has a convex shape and each of the first narrow or equal size end and the second narrow or equal size end has a concave shape.

34. The single layer structure of claim 33, wherein the first wide end of the first bowling pin structure is connected to the second narrow or equal size end of the second bowling pin structure by a first portion of connecting sheet, and the first narrow or equal size end of the first bowling pin structure is connected to the second wide end of the second bowling pin structure by a second portion of the connecting sheet.

35. The single layer structure of claim 33, further comprising an elongated member integrated with the single layer structure for vibration control.

36. The single layer structure of claim 35, wherein the elongated member comprises a wire having a core and an outer layer surrounding the core.

37. The single layer structure of claim 36, wherein the core comprises a metal and the outer layer comprises a polymer.

38. The single layer structure of claim 33 wherein each of the first bowling pin structure and the second bowling pin comprises a respective dome at the corresponding end.

39. The single layer structure of claim 33, wherein the single layer structure is a laminated structure when viewed from a top surface or a bottom surface, the single layer structure comprising a row of wide ends interleaved with a row of narrow or equal size ends.

40. The single layer structure of claim 33, wherein the first bowling pin comprises a foam material.

41. The single layer structure of claim 33, wherein the fillers comprise a material selected from a group consisting of gases, liquids, gels, and foams.

42. The single layer structure of claim 33, wherein the single layer structure has a shape memory.

43. The single layer structure of claim 33, wherein each of the first and second sidewall surrounds a hollow portion.

44. A multilayer structure comprising two or more single layer structures of claim 33.

* * * * *